(12) United States Patent
Asano et al.

(10) Patent No.: US 8,037,263 B2
(45) Date of Patent: *Oct. 11, 2011

(54) CONTROL DEVICE OF A STORAGE SYSTEM COMPRISING STORAGE DEVICES OF A PLURALITY OF TYPES

(75) Inventors: Masayasu Asano, Yokohama (JP); Masayuki Yamamoto, Sagamihara (JP); Yuichi Taguchi, Sagamihara (JP); Kenichi Kihara, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/633,218

(22) Filed: Dec. 8, 2009

(65) Prior Publication Data

US 2010/0088465 A1 Apr. 8, 2010

Related U.S. Application Data

(63) Continuation of application No. 11/511,322, filed on Aug. 29, 2006, now Pat. No. 7,644,242.

(30) Foreign Application Priority Data

Jul. 3, 2006 (JP) ................................ 2006-183710

(51) Int. Cl.
G06F 13/00 (2006.01)
G06F 13/28 (2006.01)
G06F 12/16 (2006.01)
(52) U.S. Cl. ................. 711/161; 711/154; 711/E12.103
(58) Field of Classification Search ........................ None
See application file for complete search history.

(56) References Cited

U.S. PATENT DOCUMENTS

| 7,568,075 B2* | 7/2009 | Fujibayashi et al. ........... 711/154 |
| 2004/0255080 A1 | 12/2004 | Kihara et al. |
| 2006/0047924 A1* | 3/2006 | Aoshima et al. .............. 711/161 |
| 2006/0059206 A1 | 3/2006 | Ushijima et al. |
| 2006/0242376 A1* | 10/2006 | Tsuge et al. ................... 711/165 |
| 2008/0126673 A1* | 5/2008 | Kaneda ......................... 711/103 |

FOREIGN PATENT DOCUMENTS

| JP | 10-078899 | 3/1998 |
| JP | 2005-301684 | 10/2005 |
| JP | 2006-085208 | 3/2006 |

* cited by examiner

*Primary Examiner* — Reginald G Bragdon
*Assistant Examiner* — Eric S Cardwell
(74) *Attorney, Agent, or Firm* — Antonelli, Terry, Stout & Kraus, LLP.

(57) ABSTRACT

A control device of a storage system including a CPU which receives input information including at least a size and an archive deadline of data which is stored in storage devices; wherein data management information includes a write threshold value regarding one type of storage devices, the write threshold value indicating a write limit number to the one type of storage devices, wherein the CPU: selects a storage device which stores data corresponding to the information which is input to an input device, based on the information which is input to the input device and the data management information which is stored in the memory; CPU stores to the selected storage device, the data corresponding to the information which is input to the input device; and, registers to the data management information in the memory, at least one of the information which is input to the input device.

5 Claims, 17 Drawing Sheets

FIG. 2

| STORAGE MEDIUM NUMBER | WARRANTY DEADLINE | STORAGE MEDIUM CLASS | CURRENT WRITE NUMBER |
|---|---|---|---|
| 1 | 4/30/07 | HDD | 100 |
| 2 | 4/30/08 | HDD | 100 |
| 3 | 4/30/08 | HDD | 100 |
| 4 | 4/30/08 | HDD | 100 |
| 5 | 4/30/08 | HDD | 100 |
| 6 | 4/30/08 | HDD | 100 |
| 7 | 4/30/08 | HDD | 100 |
| 8 | 4/30/08 | HDD | 100 |

| PARITY GROUP NUMBER | WARRANTY DEADLINE | TOTAL CAPACITY | FREE CAPACITY | STORAGE MEDIUM NUMBER | RAID TYPE |
|---|---|---|---|---|---|
| P0 | 4/30/07 | 100MB | 80MB | 1,2,3,4 | RAID5 |
| P1 | 4/30/08 | 120MB | 120MB | 5,6,7,8 | RAID5 |

| VOLUME NUMBER | ALLOCATED PARITY GROUP NUMBER | ALLOCATED CAPACITY |
|---|---|---|
| L1 | P0 | 20MB |
| L2 | P1 | 10MB |

200: STORAGE MEDIUM TABLE
210: PARITY GROUP TABLE
220: VOLUME TABLE

FIG. 3

| STORAGE MEDIUM NUMBER | WARRANTY DEADLINE | STORAGE MEDIUM CLASS | CURRENT WRITE NUMBER |
|---|---|---|---|
| 9 | 4/30/16 | FLASH MEMORY | 4900 |
| 10 | 4/30/16 | FLASH MEMORY | 4900 |
| 11 | 4/30/16 | FLASH MEMORY | 4900 |
| 12 | 4/30/16 | FLASH MEMORY | 4900 |

| PARITY GROUP NUMBER | WARRANTY DEADLINE | TOTAL CAPACITY | FREE CAPACITY | STORAGE MEDIUM NUMBER | RAID TYPE |
|---|---|---|---|---|---|
| P2 | 4/30/16 | 100MB | 90MB | 9,10,11,12 | RAID5 |

| VOLUME NUMBER | ALLOCATED PARITY GROUP NUMBER | ALLOCATED CAPACITY |
|---|---|---|
| L3 | P2 | 5MB |

200: STORAGE MEDIUM TABLE
210: PARITY GROUP TABLE
220: VOLUME TABLE

FIG. 4

400: ARCHIVE DATA MANAGEMENT INFORMATION TABLE

| DATA ID | ARCHIVE VOLUME | WARRANTY DEADLINE | SIZE |
|---|---|---|---|
| D1 | L1 | 4/30/07 | 20MB |
| D2 | L2 | 4/30/08 | 10MB |
| D3 | L3 | 4/30/16 | 5MB |

410: COST TABLE

| COST TARGET ITEM | BIT COST |
|---|---|
| HDD | $0.3 |
| FLASH MEMORY | $1 |
| DATA MIGRATION | $0.3 |

420: WRITE THRESHOLD VALUE TABLE

| STORAGE MEDIUM | WRITE THRESHOLD VALUE |
|---|---|
| FLASH MEMORY | 5000 TIMES |

400: ARCHIVE DATA MANAGEMENT INFORMATION TABLE
410: COST TABLE
420: WRITE THRESHOLD VALUE TABLE

500: DATA ARCHIVE DESIGNATION SCREEN

FIG. 7

| 400 | 401 | 402 | 403 | 404 | 701 | 702 | 703 |
|---|---|---|---|---|---|---|---|
| DATA ID | ARCHIVE VOLUME | ARCHIVE DEADLINE | SIZE | ACCESS PATTERN | READ TENDENCY | WRITE TENDENCY | |
| D1 | L1 | 4/30/07 | 20MB | SEQUENTIAL | SMALL | LARGE | |
| D2 | L2 | 4/30/08 | 10MB | RANDOM | SMALL | SMALL | |
| D3 | L3 | 4/30/16 | 5MB | RANDOM | LARGE | SMALL | |

| 710 | 711 | 712 | 713 | 714 |
|---|---|---|---|---|
| ACCESS PATTERN | READ/WRITE FOCUS | RECOMMENDED STORAGE MEDIUM | RECOMMENDED STORAGE MEDIUM PRIORITY | |
| RANDOM | READ FOCUS | FLASH MEMORY | 1 | |
| SEQUENTIAL | READ FOCUS | FLASH MEMORY | 2 | |

400: ARCHIVE DATA MANAGEMENT INFORMATION TABLE
710: DATA CHARACTERISTIC TABLE

500: DATA ARCHIVE DESIGNATION SCREEN

CONTROL DEVICE OF A STORAGE SYSTEM COMPRISING STORAGE DEVICES OF A PLURALITY OF TYPES

CROSS-REFERENCE TO PRIOR APPLICATION

This is a continuation of U.S. application Ser. No. 11/511,322 U.S. Pat. No. 7,644,242 filed on Aug. 29, 2006, issued on Jan. 5, 2010. This application relates to and claims priority from Japanese Patent Application No. 2006-183710, filed on Jul. 3, 2006. The entirety of the contents and subject matter of all of the above is incorporated herein by reference.

BACKGROUND OF THE INVENTION

1. Field of the Invention

The present invention relates to control of a storage system that comprises storage devices of a plurality of types.

2. Description of the Related Art

The storage system can be constituted by one or a plurality of storage subsystems (sometimes called simply 'storage' hereinbelow). A plurality of storage devices can be installed in the storage.

In a computer system in an enterprise or the like, the storage capacity of the storage also increases as the amount of data stored by the storage increases and as data is held for long periods. Further, in order to hold data for long periods, data must be archived by considering the warranty periods of the respective storage devices in the storage.

The adoption of a method that withdraws a storage device whose warranty period has expired by performing data migration to another storage device (a new storage device or a storage device whose warranty period has not yet been exceeded, for example) when the period over which the data stored in a storage device are archived is longer than the warranty period of the storage device may be considered. For example, a technology that compares the warranty period of a hard disk with the archive deadline of data, selects a hard disk for archiving data on the basis of the comparison result, and archives the data in the selected hard disk is disclosed in Japanese Patent Application Laid Open No. 2005-301684.

Furthermore, storage devices for archiving data include flash memory. Flash memory is generally said to have a long lifespan because, although there are restrictions on the write number, there is no accompanying motive power of drive rotation or the like in comparison with a hard disk. However, the bit costs of flash memory are, at the time this specification was written, higher than the bit costs of a hard disk.

In view of this fact, mixing a hard disk and flash memory as a plurality of storage devices in the storage system may be considered. When the technology of Japanese Patent Application Laid Open No. 2005-301684 is simply applied to such a storage system, the following problems can arise.

That is, because flash memory has a longer lifespan than a hard disk, there are a great number of opportunities for selecting flash memory for data archiving. However, because of the restrictions on the write number, there are cases where the lifespan of the flash memory eventually drops as the write number of the data of the flash memory increases.

Further, as mentioned earlier, the bit costs when data are stored are generally higher for flash memory than for a hard disk. In addition, bit costs are also incurred when data migration is performed from a certain storage device to another storage device. Hence, when data archiving is performed without considering the number of data migrations or the data archiving location and so forth, there is a risk of high costs being incurred in the data archiving.

The above problem can arise only when the storage devices of the plurality of types are a hard disk and flash memory.

SUMMARY OF THE INVENTION

Therefore, an object of the present invention is to suitably perform control of data archiving in a storage system in which storage devices of a plurality of types are mixed.

Further objects of the present invention will become apparent from the following description.

The control device according to the present invention is a control device of a storage system that comprises a plurality of each of storage devices of a plurality of types comprising storage devices of a first and second type. The control device comprises a first acquisition module for acquiring an archive deadline of archive target data which are the target of archiving by the storage system; a second acquisition module for acquiring a warranty deadline for the quality of data stored by the storage device and unit costs constituting the costs for a predetermined storage size of the storage device for each of the storage devices of the plurality of types; a third acquisition module for acquiring data migration costs constituting the costs required for data migration from a certain storage device among the storage devices of the plurality of types to another storage device among the storage devices of the plurality of types; and a selection module for selecting a storage device constituting the storage destination of the archive target data from the storage devices of the plurality of types on the basis of the archive deadline, warranty deadline, unit cost and data migration cost thus acquired. The selected storage device is a storage device of a type for which the total cost when the archive target data are archived until the warranty deadline is minimum. The total cost is a cost that is obtained from a first cost obtained from the product of the number of data migrations and the data migration cost, a unit cost of a data migration source, and a unit cost of a data migration destination.

The control device may be a host computer of a storage system (a host computer that issues an IO command to the storage system or a management computer that manages the storage system, for example), and may be provided in a storage system or may be provided in an intermediate device that is provided between the storage system and the host computer. Alternatively, the respective parts of the control device may be provided distributed between at least two of the host device of the storage system, the intermediate device and the storage system.

BRIEF DESCRIPTION OF THE DRAWINGS

FIG. 2 shows a constitutional example of storage configuration information 117 of a hard disk storage 110;

FIG. 3 shows a constitutional example of storage configuration information 127 of the flash memory storage 120;

FIG. 4 shows a constitutional example of data management information 109 of a data archive management device 100;

FIG. 7 is a constitutional example of the data management information 109 of a second embodiment of the present invention;

DETAILED DESCRIPTION OF THE PREFERRED EMBODIMENTS

Figure 1:
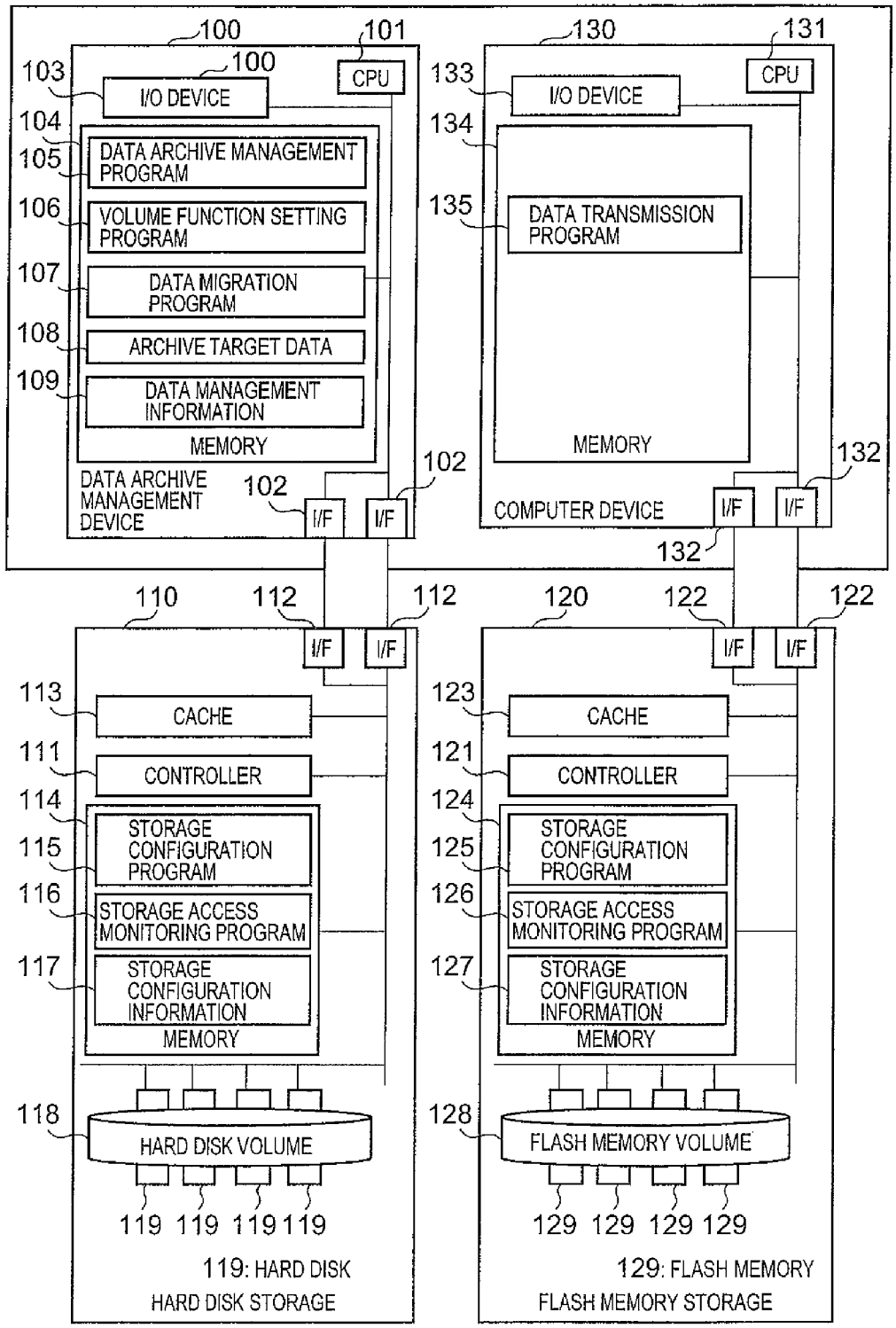
FIG. 1 shows a constitutional example of a computer system according to a first embodiment of the present invention.

An embodiment of the present invention will be described hereinbelow by adopting a flash memory and a hard disk as storage devices (called 'storage media' hereinbelow) of a plurality of types by way of example. First, an overview of the embodiment of the present invention will be described.

A storage control device (the subsequently described data archive management device, for example) selects a storage device constituting a data archive destination on the basis of the characteristic of the flash memory and the costs of data archiving and stores data in the selected storage device.

More specifically, for example, the storage control device selects a low-cost storage device from the data archive period and bit costs. For example, warranty period of the hard disk is three years and the warranty period of the flash memory is ten years. Further, suppose that the bit costs are 0.3 dollars for the hard disk and one dollar for the flash memory. Suppose also that the bit costs for data migration are 0.3 dollars.

In this case, when data of a five-year archive period are archived in the hard disk, the hard disk must be exchanged once in order to archive the data for five years because the hard disk has a warranty period of only three years. That is, two purchases of a hard disk are required. Accordingly, because the bit costs of one hard disk are 0.3 dollars, purchasing the hard disk two times means that bit costs of 0.6 dollars are incurred. Further, because the hard disk is exchanged once, costs for a single data migration are incurred. Hence, because the bit costs of the data migration are 0.3 dollars, eventually, hard disk costs of 0.6 dollars and data migration costs of 0.3 dollars are incurred, which means total bit costs of 0.9 dollars. However, even in this case, bit costs are lower than the bit cost of one dollar of the flash memory. Hence, if costs are considered, a hard disk is desirably selected.

As another example, when data of an archive period of seven years are archived in a hard disk, because such archiving involves exchanging the hard disk two times and performing two data migrations, bit costs of 1.5 dollars are eventually incurred. On the other hand, because the bit costs of the flash memory do not vary at one dollar even over an assurance period of seven years, in this case, it is said that the costs of archiving data in flash memory are lower.

As mentioned earlier, the storage control device can be selected as the storage device constituting the data archive destination by considering the costs.

Furthermore, the storage control device obtains the write number of archived data from the size of the archived data and the current write number of the flash memory. Further, the storage control device manages the threshold value of the write number of the flash memory in order to maintain the lifespan of the flash memory. Further, when the write number threshold value of the flash memory is exceeded as a result of writing archived data, the storage control device is able to perform data archiving equivalent to the excess write number while maintaining the lifespan of the flash memory by selecting a flash memory capable of additional separate storage (a flash memory for which the write number threshold value is not exceeded even when the excess write number is added to the current write number).

A few embodiments of the present invention will be described hereinbelow.

First Embodiment

FIG. 1 shows a constitutional example of a computer system according to a first embodiment of the present invention.

A data archive management device 100, a computer device 130, the hard disk storage 110, and flash memory storage 120 are connected to a communication network.

The data archive management device 100 is a computer comprising a CPU 101, a communication interface device ('I/F' hereinbelow) 102, an I/O device 103, and a memory 104.

The I/F 102 communicates with the hard disk storage 110, flash memory storage 120, and the computer device 130.

A plurality of computer programs executed by a CPU 101 and data referenced by the CPU 101 are stored in the memory 104. More specifically, for example, a data archive management program 105, a volume function setting program 106, a data migration program 107, archive target data 108, and data management information 109 are stored. The archive target data 108 and data management information 109 are information used by the data archive management program 105, volume function setting program 106, and data migration program 107. When a computer program is the subject hereinbelow, the processing is actually performed by the CPU that executes the computer program.

The I/O device 103 is a device that inputs and outputs information between the CPU 101, I/F 102, and the user.

The computer device 130 is a computer comprising a CPU 131, an I/F 132, an I/O device 133, and a memory 134.

The I/F 132 communicates with the data archive management device 100, hard disk storage 110, and flash memory storage 120 and so forth.

A data transmission program 135 executed by the CPU 131 is stored in the memory 104. The data transmission program 135 transmits data to the data archive management device 100 so that the latter judges which volume of a particular storage data is stored in. Further, the data archive management device 100 determines the storage location of the data and stores the data as is. Otherwise, the data archive management device 100 may determine the storage destination and report same to the computer device 130 and the computer device 130 may store the data in the reported storage destination.

The I/O device 133 input and outputs information between the I/F 132 and user.

The hard disk storage 110 is a storage system comprising a controller 111, an I/F 112, a cache 113, a memory 114, a hard disk volume 118, and a plurality of hard disks 119.

The I/F 112 sends and receives data I/O related to the reading and writing of the computer device 130 and performs communications related to operation requests from the data archive management device 100. Further, a plurality of the I/F 112 may be prepared depending on the type of communication format. For example, when communications related to the data archive management device 100 and related to operation requests thereof are IP (Internet Protocol), an I/F that performs IP-compliant communications is prepared and, when data I/O-related communications are FC (Fibre Channel), an I/F that performs FC-compliant communications may be prepared. Further, as a result of differences in applications and setting differences and so forth, a plurality of the I/F may be disposed even for the same protocol.

The cache 113 is memory that is used in order to improve the performance of the hard disk storage 110. More specifically, the cache 113 temporarily stores write target data that is written from the computer to the hard disk volume 118 ('write data' hereinbelow) and read target data that is read from the hard disk volume 118 to the computer ('read data' hereinbelow), and so forth.

The hard disk volume 118 is a logical storage medium that is prepared from the storage resources provided by one or a plurality of hard disks 119 and which stores data resulting from the operations of the computer (data archive management device 100, for example). The hard disk volume 118 is sometimes a medium of the hard disk 119 and sometimes a logical volume that holds a plurality of hard disks 119 to implement a RAID configuration volume.

A storage configuration program 115, a storage access monitoring program 116, and storage configuration information 117 are stored in the memory 114. The storage configuration program 115 and storage access monitoring program 116 are executed by the controller 111. The storage configuration information 117 is information that is used by the storage configuration program 115 and storage access monitoring program 116 and is information that can be managed by the hard disk storage 110.

The storage configuration program 115 is a program for managing the configuration of the hard disk storage 110. The storage configuration program 115 has a function that allows a computer such as the data archive management device 100 to identify the hard disk volume 118 via the I/F 112 (program module) and a function for performing data migration between hard disk volumes, and so forth.

The storage access monitoring program 116 is a program for monitoring what kind of access is made to the hard disk storage 110. The storage access monitoring program 116 monitors the number of writes (write number) in units of the hard disk volume 118 and write number for each hard disk 119 constituting the hard disk volume 118.

The flash memory storage 120 is a storage subsystem comprising a controller 121, an I/F 122, a cache 123, a memory 124, a flash memory volume 128, and a plurality of flash memories 129.

The I/F 122 sends and receives data I/O related to the reading and writing of the computer and performs communications related to operation requests from the data archive management device 100 and computer device 130 and so forth. Further, a plurality of the I/F 122 may be prepared depending on the form of communication as per the I/F 112.

The cache 123 is memory that is used in order to improve the performance of the flash memory storage 120. More specifically, the cache 113 temporarily stores write data that are written from the computer to the flash memory volume 128 and read target data that are read from the flash memory volume 128 to the computer, and so forth.

The flash memory volume 128 is a logical storage medium that is provided by the storage resources of a plurality of flash memories 129. The flash memory volume 128 is sometimes a medium of the flash memory 129 and sometimes a logical volume that holds a plurality of flash memory 129 to implement a RAID configuration volume.

A storage configuration program 125, a storage access monitoring program 126, and storage configuration information 127 are stored in the memory 124. The storage configuration program 125 and storage access monitoring program 126 are executed by the controller 121. The storage configuration information 127 is information that is used by the storage configuration program 125 and storage access monitoring program 126 and is information that can be managed by the flash memory storage 120.

The storage configuration program 125 is a program for managing the configuration of the flash memory storage 120. The storage configuration program 125 has a function that allows a computer such as the data archive management device 100 to identify the flash memory volume 128 via the I/F 122 and a storage function for performing data migration between flash memory volumes, and so forth.

The storage access monitoring program 126 is a program for monitoring what kind of access is made to the flash memory storage 120. The storage access monitoring program 126 monitors write number in units of the flash memory volume 128 and write number for each storage medium constituting the flash memory volume 128.

In the hard disk storage 110 and flash memory storage 120, the respective constituent elements differ in that the storage media are either hard disks or flash memory, but the hard disk storage 110 and flash memory storage 120 may comprise commonly available constituent elements. Further, the number of volumes illustrated in the respective storages is one but a plurality of volumes can also be installed in the respective storages.

FIG. 2 shows a constitutional example of the storage configuration information 117 of the hard disk storage 110. FIG. 3 shows a constitutional example of the storage configuration information 127 of the flash memory storage 120.

The storage configuration information 117 and 127 can also comprise table groups with the same configuration. The storage configuration information 117 and 127 include a storage media table 200, a parity group 210, and a volume table 220, for example. Here, a parity group is a group constituted by a plurality of storage media which is a unit that constitutes a RAID.

The storage media table 200 has a column 201 in which a storage medium number indicating a number that identifies the storage medium of the hard disk 119 and flash memory 129 is written, a column 202 in which the warranty deadline of the storage medium is written; a column 203 in which the class of storage medium is written, and a column 204 in which the current write number of the storage medium is written. The storage medium number, warranty deadline, storage medium type, and current write number are recorded for each storage medium. The warranty deadline is "Apr. 30, 2007" when the storage medium number is "1", for example. This represents the fact that Apr. 30, 2007 is the warranty deadline. The warranty deadline is similarly interpreted for the other storage media (for example, the fact that Apr. 30, 2008 is the warranty deadline is represented for the warranty deadline of another storage medium). Further, a value such as HDD or flash memory, for example, is entered as storage medium type. HDD represents a hard disk. Further, when the storage medium is a hard disk, the current write number need not be saved because the value of the current write number is not used in this embodiment.

The parity group table 210 has a column 211 in which the parity group number is written, a column 212 in which the warranty deadline is written, a column 213 in which the total capacity is written, a column 214 in which the free capacity is written, a column 215 in which the storage medium number is written, and a column 216 in which the RAID type is recorded. The parity group number, warranty deadline, total capacity, free capacity, storage medium number, and RAID type are recorded for each parity group.

The parity group number is an identifier that is uniquely assigned in order to identify a parity group formed in the hard disk storage 110 and the flash memory storage 120.

The warranty deadline is the warranty deadline for the quality of the parity group. The warranty deadline of one parity group equals the earliest of the warranty deadlines of the storage media constituting the parity group, for example.

The total capacity is the total volume of data that can be archived in a parity group.

The free capacity is the capacity of the unused archive region of the parity group and has a value obtained by subtracting the amount of data already archived in the parity group (the used storage capacity) from the total capacity.

The storage medium number is an identifier of a storage medium that constitutes the parity group which is represented by the same information as the information recorded in the column 201. For example, the storage media that constitute the parity group "P0" are the storage media with the numbers "1", "2", "3", and "4". This shows that the parity group is constituted by storage media indicated by the numbers of the storage medium numbers "1", "2", "3", and "4" of the storage media table 200.

The RAID type expresses the level of the RAID (Redundant Array of Independent (or Inexpensive) Disks) of the parity group.

The volume table 220 has a column 221 in which the volume number is written, a column 222 in which the number of the allocated parity group is written, and a column 223 in which the allocated capacity is written. The volume number, allocated parity group, and allocated capacity are recorded for each volume. A volume is a region for storing data. However, in a volume created from a RAID-constituted parity group, even when data is physically distributed between a plurality of storage media, the volume can be logically treated as one region. Further, a volume is sometimes called a logical unit.

The volume number is an identifier that is uniquely assigned in order to identify the hard disk volume 118 and flash memory volume 128 and so forth.

The allocated parity group number represents the number of the parity group to which the hard disk volume 118 and flash memory volume 128 and so forth have been allocated. The allocated parity group number is the same information as the parity group number written to the parity group table 210.

The allocated capacity is the data capacity allocated to the hard disk volume 118 and flash memory volume 128 and so forth.

Furthermore, when the volume is not a RAID configuration, the parity group table 210 need not be installed and there are no longer any allocated parity group numbers of the volume table. Instead, storage media numbers that correspond with the respective volume numbers and which are added to the volume table 220 can be stored as storage media numbers.

FIG. 4 is a constitutional example of data management information 109 of the data archive management device 100.

The data management information 109 includes an archive data management information table 400, a cost table 410, and a write threshold value table 420, for example.

The archive data management information table 400 has a column 401 in which the data ID is written, a column 402 in which the archive volume number is written, a column 403 in which the warranty deadline is written, and a column 404 in which the data size is written. The data ID, archive volume number, warranty deadline and data size are recorded for each data recorded in the storage.

The data ID is an identifier that is assigned in order to identify data recorded in the hard disk storage 110 and flash memory storage 120.

The archive volume number is the number of the hard disk volume 118 and flash memory volume 128 in which the data are archived. In order to rapidly specify the archive volume, the number of the parity group or the number of the storage medium or the like may also be stored associated with the information on the archive volume.

The warranty deadline is the deadline by which the data must be archived in the hard disk storage 110 and flash memory storage 120.

The data size is the data size of the archive target data.

The units of the data may be units called files or separately managed metadata and primary data that constitute the files may be the data units. Further, a directory in which files are grouped and all the files thereof may be treated as one data which may be a collection of information of a certain significance known as the content.

The cost table 410 is an example of information on the costs required for data archiving. The cost table 410 includes a column 411 in which the cost target item is written and a column 412 in which the bit cost is written.

The cost target item indicates an item that is the target of data archiving-related costs. Cost target items include "HDD" and "flash memory" as costs when the hard disk 119 and flash memory 129 are used as the storage media and "data migration" which is the cost of performing data migration to another storage medium when the lifespan of a certain storage medium is reached, as shown in the example of the cost table 410.

The bit cost represents the bit cost of the respective cost target items. For example, in the case of a "HDD", the bit cost is indicated as "0.3 dollars".

Because the cost target item also includes cases where the costs differ for storage media of the same type, there are also cases where management is performed for each individual storage medium, and each storage medium can be identified by the cost target item. For example, if the formats HDD-A and HDD-B exist for the same HDD, information can be registered in the cost table individually. Further, after the data migration, if there are special costs when the migration source volume is deleted, functions related to the volume data deletion are also cost targets and, therefore, these functions are also registered as cost target items. There are also cases where the values themselves of the storage media and functions and so forth decrease each year. In order to cater to such cases, the bit costs of the individual storage media and functions may be managed for each period.

The write threshold value table 420 is a table for managing storage media obtained by providing write threshold values for data archiving in storage media that perform the data archiving, and the write threshold values. The write threshold value table 420 has a column 421 in which the class of storage medium is written and a column 422 in which the threshold value of the write number related to the storage medium class ('write threshold value' hereinbelow) is written.

'Write threshold value' as it is used here is the condition for deciding to perform data migration to another storage medium for data archiving when data is written to the target storage medium until the write number is reached. Where the write threshold value is concerned, the write limit number itself that exists in the flash memory may be used as the threshold value, or a value on the order of 80% of the write limit number may be set and used the value at which writes that exceed this value are judged to be dangerous.

According to the example of the write threshold value table 420 (because the example in the table is a threshold value of 5000 times), the value of 5000 times is established as the write threshold value for the flash memory constituting the storage medium. Once the writes exceed 5000 times, the condition for considering archiving the data in another storage medium is fulfilled.

With respect to setting the write threshold value, the write threshold value may be a fixed value but, in order to use the flash memory for a long period, a method that sets the value of the threshold value at regular intervals may also be considered for a certain period. For example, by setting the write threshold value at 500 times for the first year and then increasing the threshold value by 500 every other year, a write threshold value of 5000 times of writing may be established over a ten-year period. The update of the write threshold value may be performed manually by the user but can also be performed automatically by using hardware or software.

Figure 5:
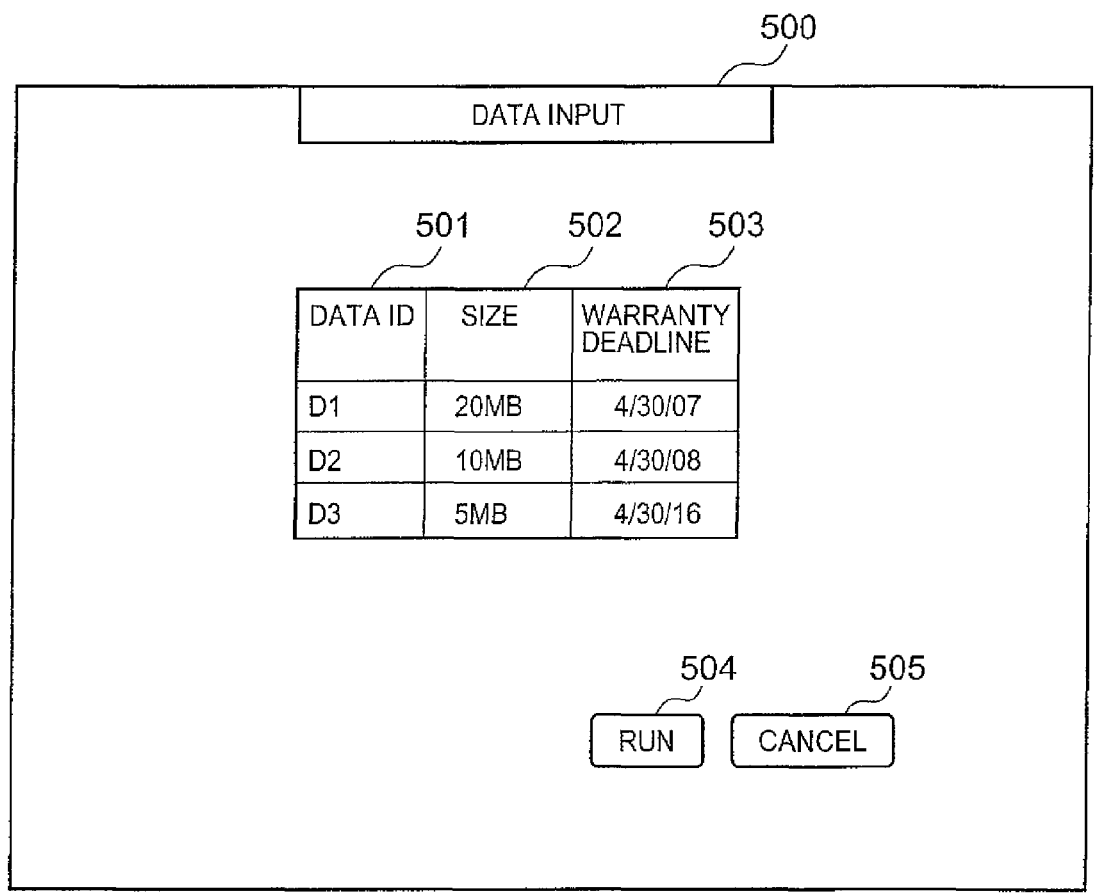
FIG. 5 shows an example of a data archive designation screen.

FIG. 5 shows an example of a data archive designation screen.

A data archive designation screen 500 is an example of a GUI (Graphical User Interface) that is displayed by the data archive management program 105 of the data archive management device 100 when a data archive instruction is received from the user. The data archive designation screen 500 has, for example, a data ID entry field 501, a data-size entry field 502, and an archive deadline entry field 503. There is a Run button 504 that actually issues an execution request and a button 505 that cancels the execution for each of the entry fields 501, 502, and 503. The cancel button 505 may appear after the run button 504 is pushed.

The data archive management program 105 receives the attributes of the archive target data, which are the data ID, data size, and archive deadline via the screen 500. The data ID, data size, and archive deadline input via the screen are each recorded in the archive data management information table 400. For example, when, according to the example in FIG. 5, the data ID "D1", data size "20 MB", and archive deadline "Apr. 30, 2007" are input by the user and the run button 504 is pushed, the data archive management program 105 searches for the archive location of the archive target data in accordance with the flowchart of FIG. 6 and stores the archive target data thus input in the found archive location.

Figure 6:
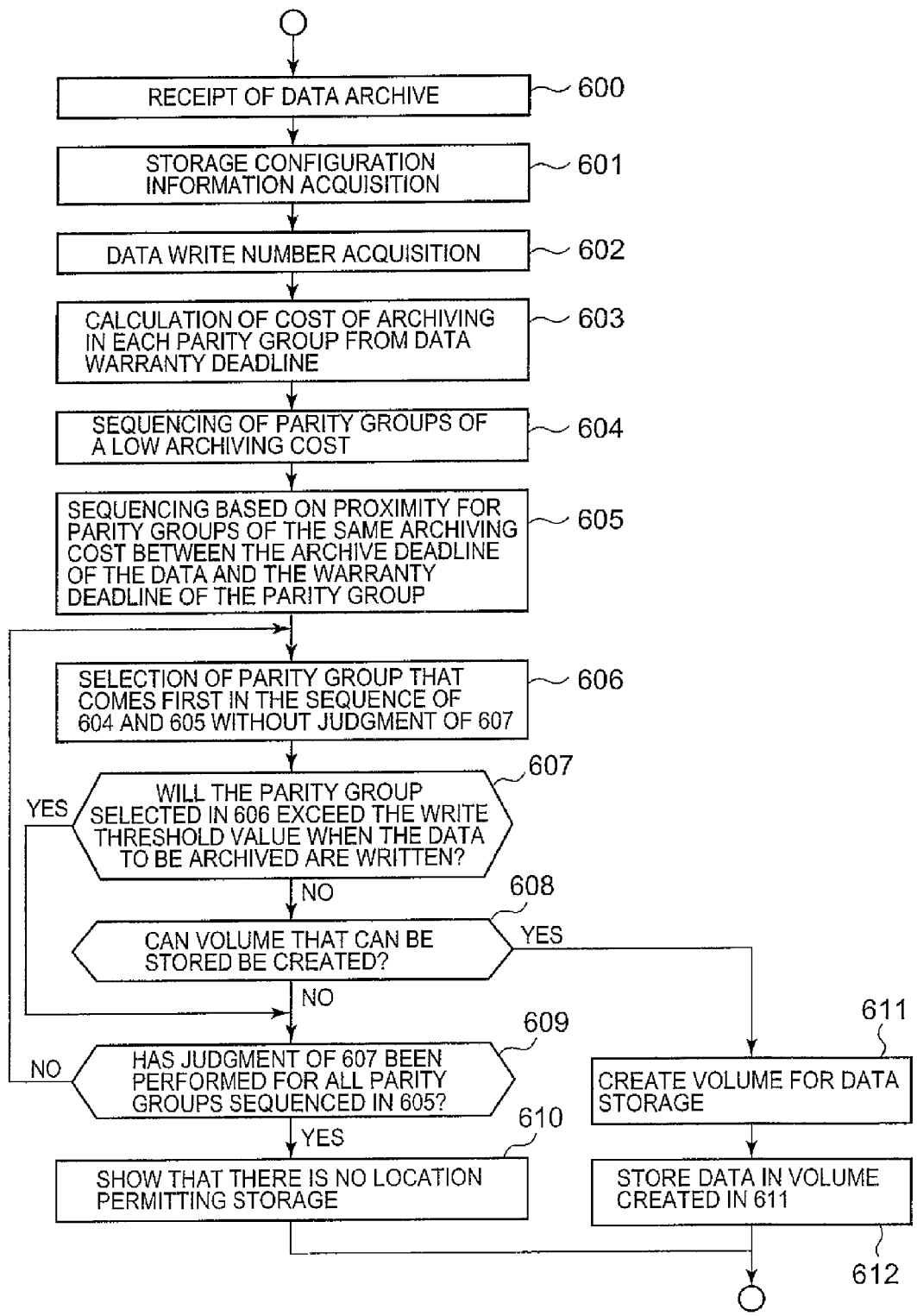
FIG. 6 is an example of a flowchart of processing to store archive target data.

FIG. 6 is an example of a flowchart of the storage processing of the archive target data.

The respective processes of the flowchart can be executed by the data archive management program 105. The flowchart of FIG. 6 relates to one archive target data and, when a plurality of archive target data are stored, the flowchart is executed a number of times equivalent to the stored archive target data. An example is storage starting with the archive target data that correspond with the uppermost row when the attributes of the plurality of archive target data are each registered in the data archive designation screen 500. When the data storage order is considered, the method of registration of the data archive designation screen 500 is considered and the user may register data for preferential storage at the top. Alternatively, the data archive management program 105 may receive the priority order via the screen 500 and the data storage order may be controlled in accordance with pre-registered policies.

A data archive request is received from the user as a result of the processing of the data archive management program 105 (step 600). The user requests data archiving by means of the data archive designation screen 500 shown in FIG. 5. The data archive management program 105 then moves to step 601.

In step 601, the data archive management program 105 obtains volume information, parity group information, and storage medium information from the storage configuration information 117 and 127 of the hard disk storage 110, flash memory storage 120 respectively. The data archive management program 105 then moves on to step 602.

In step 602, the data archive management program 105 obtains the write number of the stored archive target data. The write number can be calculated on the basis of the data size that is input, for example. More specifically, for example, if the 20 MB archive target data is written 64 KB at a time, a write number of 320 times is required. The data archive management program 105 then moves to step 603.

In step 603, the data archive management program 105 calculates the archiving costs when a volume is created in a parity group that is obtained in step 601 from the archive deadline of the data archive request obtained in step 600.

The archiving costs are determined by the newly arising bit cost of a volume of the storage medium that is newly introduced when the archive deadline of the volume is exceeded, that is, when the archive deadline of the parity group to which the volume belongs is exceeded, and by the costs of performing data migration from the existing volume to the newly introduced storage medium. More specifically, the current date is Apr. 30, 2006, for example. According to the example of the data archive designation screen 500, the archive period of the archive target data of data ID "D1" is Apr. 30, 2007. When parity groups include "P0", "P1", and "P2" as shown in FIGS. 2 and 3 in the storage configuration information 117 and 127, parity group "P0" has an archive deadline of Apr. 30, 2007 and, because same is constituted by a HDD, a HDD bit cost applies. Hence, a bit cost of 0.3 dollars is incurred. As mentioned earlier, although volume "L2" has a bit cost of 0.3 dollars, in the case of volume "L3", because this volume is flash memory, it is clear that a bit cost of 1.0 dollar applies.

After step 603 above, the data archive management program 105 moves on to step 604.

In step 604, the data archive management program 105 sequences parity groups with low calculated archiving costs. That is, the data archive management program 105 sequences the parity groups in ascending order so that the parity group with the lowest calculated archiving cost has the highest priority. The data archive management program 105 then moves on to step 605.

According to the above example, it is clear that, where the archiving costs of archive target data "D1" are concerned, the bit cost of parity group "P0" is 0.3 dollars, the bit cost of parity group "P1" is 0.3 dollars, and the bit cost of parity group "P2" is 1.0 dollars. The parity groups "P0" and "P1" have the same costs. However, this sequencing is performed in the subsequent step 605. The parity group "P2" is the third lowest in archiving costs after "P0" and "P1".

In step 605, the data archive management program 105 performs sequencing of parity groups with the same archiving costs. Here, the data archive management program 105 sequences parity groups whose data archive deadline and parity group archive deadline are close.

For example, the archive deadline of the archive target data of data ID "D1" is Apr. 30, 2007. In step 604, because both parity group "P0" and parity group "P1" have the same archive costs and the same ranking, the data archive management program 105 checks the archive deadlines of the two parity groups. It can be seen from the example of parity group table 210 that the warranty deadline of parity group "P0" is Apr. 30, 2007 and the warranty deadline of parity group "P1" is Apr. 30, 2008. Hence, it is clear that parity group "P0" is closer to the warranty deadline of the archive target data and, therefore, the data archive management program 105 assigns a higher ranking to the parity group "P0". Hence, the sequence "P0", "P1", and "P2" results in steps 604 and 605.

Following step 605, the data archive management program 105 moves to step 606.

In step 606, the data archive management program 105 does not perform the judgment of subsequent step 607 and selects the parity group that comes first in the sequence of steps 604 and 605. The data archive management program 105 then moves to step 607.

For example, if the order is "P0", "P1", and "P2", the data archive management program 105 first selects parity group "P0" and subsequently selects "P1" and then "P2" in the course of this step.

In step 607, the data archive management program 105 checks whether the current write number exceeds the write threshold value when the archive target data is written to the parity group selected in step 606. If the write threshold value is exceeded, the data archive management program 105 moves to step 609 and if the write threshold value is not exceeded, the data archive management program 105 moves to step 608.

For example, when parity group "P0" is judged, it can be seen from the parity group table 210 of the storage configuration information 117 that the storage media constituting parity group "P0" are "1", "2", "3", and "4". It can be seen from the storage medium table 200 that the storage media "1", "2", "3", and "4" are HDD. It can also be seen from the write threshold value table 420 of the data management information 109 that the data archive management program 105 does not set a HDD-related write threshold value and has no influence on the write threshold value. Accordingly, in this case, the data archive management program 105 judges that the current write number does not exceed the write threshold value and then moves to step 608.

Further, when the parity group "P1" is judged in step 607, because "P1" is also constituted by a HDD, this indicates that there is no effect on the write threshold value. Accordingly, so too in this case, the data archive management program 105 judges that the current write number does not exceed the write threshold value and moves to step 608.

Further, when parity group "P2" is judged in this step 607, the data archive management program 105 specifies that "P2" is constituted by a flash memory. In addition, the data archive management program 105 knows from the write threshold value table 420 that the write threshold value is 5000 times. The data archive management program 105 must then check whether the current write number exceeds the write threshold value when archive target data is written to the parity group "P2". The data archive management program 105 knows from the parity group table 210 and storage media table 200 that the current write number of the storage media "9", "10", "11", and "12" that constitute parity group "P2" is 4900 times in each case.

Further, it can be seen from the RAID type of the parity group table 210 that the parity group "P2" is a RAID5 configuration. The RAID5 write number of four storage media is a data write for three storage media of the four storage media and a parity write for one storage medium. Hence, a write number that is 4/3 times write number to a normal disk is large (many). More specifically, because data are written sequentially to each one of the storage media, if the write number of the archive target data is 300, for example, the write number to the volume of the parity group is 400 and four storage media are employed for one storage medium. Hence, the write number is ¼ of 400, i.e. 100. Hence, with respect to the data of a write number of 300, in this case, write number to one storage medium is 100 (when writes are performed with this write number, the current write number of the respective storage media is updated by the storage access monitoring program 126).

According to the example of the storage medium table 200 of the storage configuration information 117 of the flash memory storage 120, the current write number of each of the current storage media is 4900 and the data archive management program 105 knows that the current write number of one storage medium is 5000 when archive target data of a write number of 300 are stored as mentioned earlier. Hence, in this case, because the threshold value is still not exceeded, the data archive management program 105 moves to step 608. However, if the data write number is 600, for example, the data archive management program 105 knows that the write number of one storage medium is 200. Hence, in this case, the current write number of one storage medium is 5100 and it is clear, in this case, that the write threshold value is exceeded. Thus, in this case, the data archive management program 105 moves on to step 609.

In step 608, the data archive management program 105 judges whether a volume capable of storing archive target data can be created in the parity group on the basis of the free capacity of the parity group (parity group selected in step 606). The data archive management program 105 judges that archive target data can be stored in the parity group if the size of the archive target data to be stored is smaller than the free capacity of the parity group. If the volume can be created, the data archive management program 105 moves to step 611 and, if not, the data archive management program 105 moves to step 609.

More specifically, for example, when the total capacity of the parity group "P0" is 100 MB, the free capacity is also "100 MB", and the data size of the archive target data "D1" is 20 MB based on the example of the data archive designation screen 500, the data archive management program 105 judges that data storage is possible because the free capacity is greater than the data size. In this case, the data archive management program 105 moves to step 611. However, if the data size of archive target data "D1" is greater than 100 MB, the data archive management program 105 knows that the archive target data cannot be stored in the parity group "P0". In this case, the processing moves to step 609.

In step 609, the data archive management program 105 judges that the judgment of step 607 has not been performed for all the parity groups sequenced in step 605. That is, the data archive management program 105 checks whether the judgment has been performed for all the parity groups that are to be judged. If the judgment has been performed for all the parity groups, the data archive management program 105 moves to step 610 and, if not, the data archive management program 105 moves to step 606 and it is judged whether the data can be stored in another parity group.

In step 610, when there is nowhere permitting storage of the archive target data, that is, there is no parity group capable of storing archive target data, the data archive management program 105 presents this result to the user and then ends the processing.

In step 611, the data archive management program 105 creates a volume for storing the archive target data in the parity group. The size of the volume may be the same as the size of the data.

For example, the archive target data "D1" has a data size of 20 MB. The data archive management program 105 creates a volume with a data size of 20 MB in parity group "P0" which is judged as being capable of storing archive target data "D1". In this case, in the storage configuration information 117, the free capacity of the parity group changes from 100 MB to 80 MB. Further, information on the new volume "L1" is stored in the volume table 220. The update of the storage configuration information 117 is performed as a result of the data archive management program 105 reporting updated information to the storage configuration program 115 and the storage configuration program 115 writing the updated information in a predetermined position of the storage configuration information 117.

In step 612, the data archive management program 105 stores archive target data to the volume created in step 611. Further, the data archive management program 105 registers the ID of the stored archive target data, the ID of the volume of the archive destination, and the archive deadline and data size in the archive data management table 400 of the data management information 109. The processing is terminated after step 612 has finished.

In the above processing, the data archive management program 105 creates a volume each time archive target data is stored. However, an existing volume may be selected and data may be stored in the selected volume. In this case, in step 608, before a volume capable of storage can be created, the data archive management program 105 checks whether free capacity for writing the archive target data exists in the existing volume. When the judgment is performed, the free capacity of each volume must be registered in the volume table 220 of the storage configuration information 117 and 127. The free capacity of the volume is also dependent on the host that stores the archive target data and the management conditions of the data archive management device, for example. Hence, this information may be registered in the data management information 109 in accordance with the ID of the volume. If free capacity of the volume exists, the data archive management program 105 may perform step 612 and, if no free capacity exists, the data archive management program 105 may check whether there is a volume for storing the archive target data among all the volumes. In this case, when the checking order starts with the volume with the largest free capacity, the number of checks is small.

Furthermore, in FIG. 6, when a volume not constituting the parity group, that is, the storage medium itself is treated as a volume in storage medium units, the description of the parity group in FIG. 6 is substituted as the 'storage medium' and processing may be performed.

The first embodiment was described hereinabove. A computer program installed in the data archive management device 100 may be in the storage 110, 120 or in the computer device 130. Further, in this first embodiment, the data migration program 107 checks at regular intervals for the existence of a storage medium for which the archive deadline of the archive target data exceeds the warranty deadline of the storage medium and whose warranty deadline is the current time. If such a storage medium is found, the data in the storage medium can be caused to migrate to another storage medium. The selection of the other storage medium can be performed on the basis of the cost table 410.

According to the first embodiment, in a storage system in which a hard disk and a flash memory are mixed, the lifespan of the flash memory is not exhausted and data archiving that corresponds with the archive period of the archive target data is possible. Further, data archiving costs can be reduced.

Second Embodiment

The second embodiment of the present invention will be described hereinbelow. Further, differences from the first embodiment will mainly be described below and descriptions of points in common with the first embodiment will be omitted or simplified (the same is true of the other embodiments).

FIG. 7 shows a constitutional example of the data management information 109 of the second embodiment of the present invention.

In the second embodiment, the configuration of the archive data management information table 400 differs from that of the first embodiment. Hence, FIG. 7 shows the archive data management information table 400. Because there is no difference in the configuration of the cost table 410 and write threshold value table 420, tables 410 and 420 are not shown in FIG. 7. Further, because a data characteristic table 710 is added in the second embodiment, FIG. 7 shows the constitutional example of the table 710.

In addition to the columns described in the first embodiment, the archive data management information table 400 has a column 701 in which the access pattern of the data is recorded, a column 702 in which the Read tendency that represents the data read tendency is recorded, and a column 703 in which a Write tendency that represents the data write tendency is recorded.

The access pattern is the data access pattern and, more specifically, is shown as either sequential or random. The Read tendency expresses the data read tendency by means of an expression such as 'large' or 'small' ('many' or 'not many'). 'Large' or 'small' may be judged by setting a certain read number as the threshold value. The Write tendency expresses the data write tendency by means of an expression such as 'large' or 'small'. 'Large' or 'small' may be judged by setting a certain read number as the threshold value. At least one of the access pattern, Read tendency and Write tendency may be set manually and the data archive management program 105 may monitor the status (access status) of the data IO with respect to the volume and may perform a timely update in accordance with the monitoring result.

The data characteristic table 710 has a column 711 in which the data access pattern is recorded, a column 712 in which a read focus or write focus is recorded, a column 713 in which the recommended storage medium for the access pattern and Read/Write focus value is recorded, and a column 714 in which the priority of the recommended storage medium is recorded. According to FIG. 7, the recommended storage medium for random access has a higher priority than the recommended storage medium for sequential access. Further, when a Write focus is written as the value of the Read/Write focus, the recommended storage medium is preferably a HDD rather than flash memory. The flash memory has a write number limit.

The data characteristic table 710 is used to obtain the recommended storage medium from a data characteristic such as the access pattern or Read/Write focus. For example, if the access pattern is "random" and the Read/Write focus is "Read focus", it is clear that the recommended storage medium is the flash memory. In reality, because no consideration of the hard disk seek time or rotation wait time is required for the flash memory, the random read easily produces the flash memory characteristic and the IO processing is high-speed processing. The table is used in the subsequent flowchart and, as a result of the user's designation of the data characteristic and the actual data access conditions, data is stored in the recommended suitable storage medium.

Figure 8:
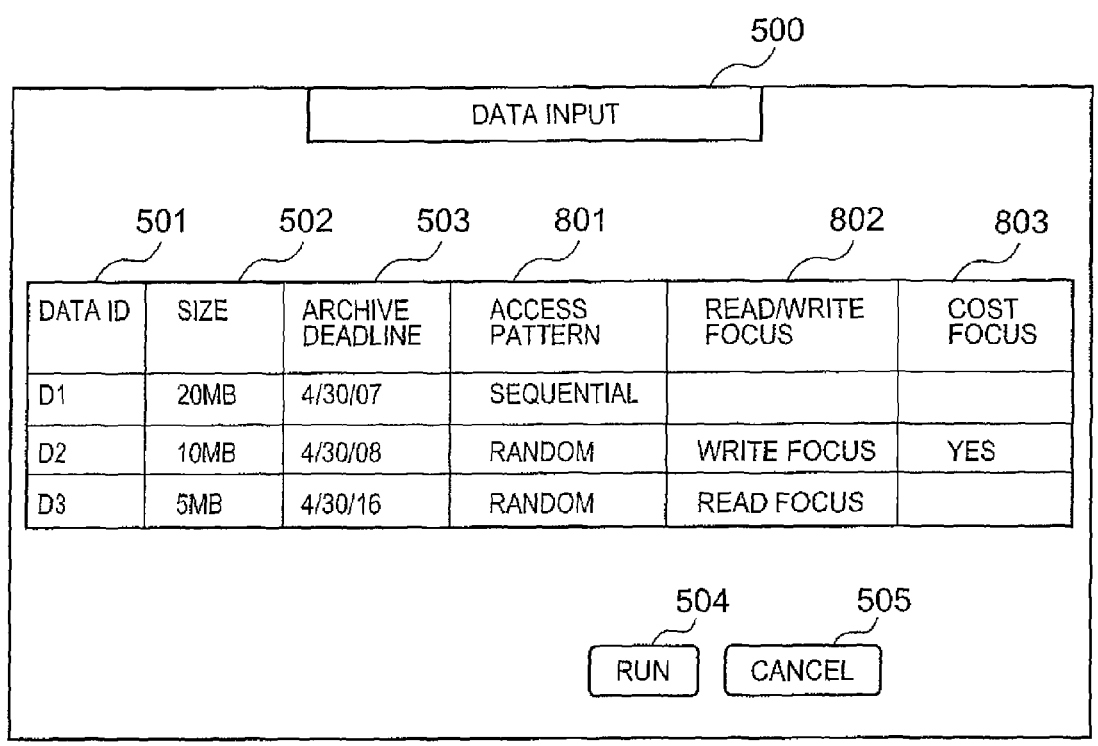
FIG. 8 is an example of a data archive designation screen of the second embodiment of the present invention.

FIG. 8 is an example of the data archive designation screen of the second embodiment of the present invention.

In addition to the entry fields described in the first embodiment, the data archive designation screen 500 displays an access pattern entry field 801, a Read/Write focus entry field 802, and an entry field 803 indicating whether there is a focus on cost. The user is able to enter the access pattern, indicate whether the application of the volume has a Read focus or a Write-focus, and specify the existence of a cost focus. In the case of a Read focus, the value "Read focus" is entered, and, in the case of a Write focus, "Write focus" is entered. These values are sometimes not designated. The cost focus existence is either high or low for the volume that stores archive target data but, in this value, Yes is registered when the archive target data is to be treated with an emphasis on the archiving cost. If this is not the case, no input is made or No is entered.

Figure 9:
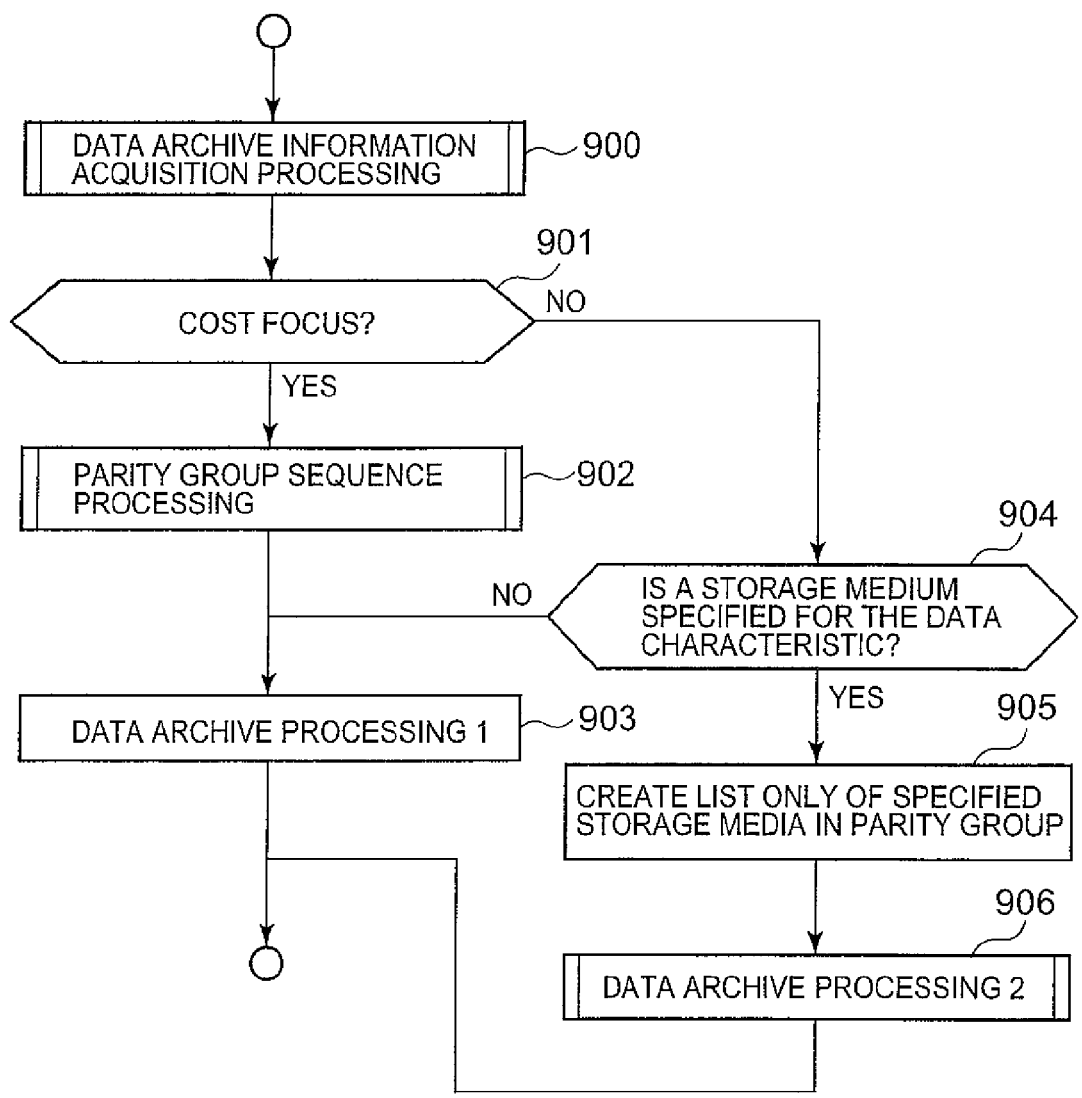
FIG. 9 is an example of a flowchart of data storage processing of the second embodiment of the present invention.

FIG. 9 is an example of the flowchart of data storage processing according to the second embodiment of the present invention.

The data archive information acquisition processing of step 900 represents the processing of steps 600, 601, and 602 of the flowchart in FIG. 6. After the processing is terminated, the data archive management program 105 moves to step 901.

In step 901, the data archive management program 105 judges whether the user request is cost-focused. The existence of a cost focus can be judged from the cost focus existence entered in the data archive designation screen 500 of FIG. 8. If 'Yes' is designated in the cost focus existence entry field 803, there is a cost focus and the data archive management program 105 moves to step 902. Otherwise, that is, when there is no particular designation with respect to a cost focus 803, the data archive management program 105 moves to step 904.

The parity group sequencing of step 902 represents steps 603, 604, and 605 of the flowchart of FIG. 6. The data archive management program 105 then proceeds to step 903.

The processing of the data archiving processing 1 of step 903 represents step 606 of the flowchart in FIG. 6 and the subsequent steps. That is, in the case of cost-focused data, data archive processing is performed by means of the same steps as FIG. 6.

In step 904, the data archive management program 105 judges whether the storage medium is specified by a data characteristic. This is determined from the access pattern and Read/Write focus entered in the data archive designation screen 500 of FIG. 8 and from the settings of the data characteristic table 710 of FIG. 7.

For example, according to the examples of FIGS. 7 and 8, it can be seen that there is a data archive request for archive target data "D3", the access is "random", and there is a "Read focus". In this case, according to the data characteristic table of FIG. 7, it can be seen that flash memory is recommended as the storage medium for the criteria "random" and "Read focus". In this case, in step 904, the processing involves determining whether there is a specified storage medium. Hence, in this case, the data archive management program 105 then moves to step 905.

Further, in the case of the user request of FIG. 8, for example, a case where there is no cost focus designation in the archive target data "D1" is considered. In this case, the data archive management program 105 moves from step 901 to step 904. However, although the access pattern "sequential" has been entered in the screen 500, neither a Read focus nor a Write focus has been entered. In this case, because a recommended storage medium has not been designated in the absence of a Read focus in the data characteristic table 710 of FIG. 7, in this case, the processing of step 904 indicates that there is not a specified storage medium. Hence, in this case, the data archive management program 105 moves to step 902, whereupon the same processing as in FIG. 6 is performed.

In step 905, the data archive management program 105 creates a list of only the specified storage media in the parity group, in other words, selects a parity group constituted by specified storage media. That is, here, although the same processing as that of steps 603, 604, and 605 in the flowchart of FIG. 6 is performed, the processing may be executed only for specified storage media. For example, if the flash memory is selected as the specified storage medium, the data archive management program 105 makes only the parity groups constituting the flash memory the target of the list and, among these parity groups, the data archive management program 105 may select, in order starting with the lowest cost parity group, the parity groups for which the warranty deadline of the storage medium and warranty deadline of the archive target data are close. However, in step 905, because there is no cost focus, the archiving cost is not set as high or low and capacity-dependent sequencing such as sequencing in which parity groups for which the free capacity and data size are close are selected, for example, may be performed. Further, if the performance of each parity group is measured, the data archive management program 105 may perform sequencing starting with the parity group with the highest performance (fast I/O processing, for example). Further, in this case, the data archive management program 105 may also designate whether the request for archive target data has a performance focus. Following the processing of step 905, the data archive management program 105 moves to step 906.

In the data archive processing 2 of step 906, step 606 and subsequent processing is performed on the sequence of parity groups created in step 905.

As a result of this processing, data archiving can be executed by selecting data archive storage media and parity groups that also conform to the data characteristic instead of performing data archiving based on archiving costs and write restrictions and so forth and by determining a suitable data archive destination. Further, in the selection of the parity groups, parity groups with the lowest costs may be selected among the parity groups that conform to the data characteristic, for example.

Figure 10:
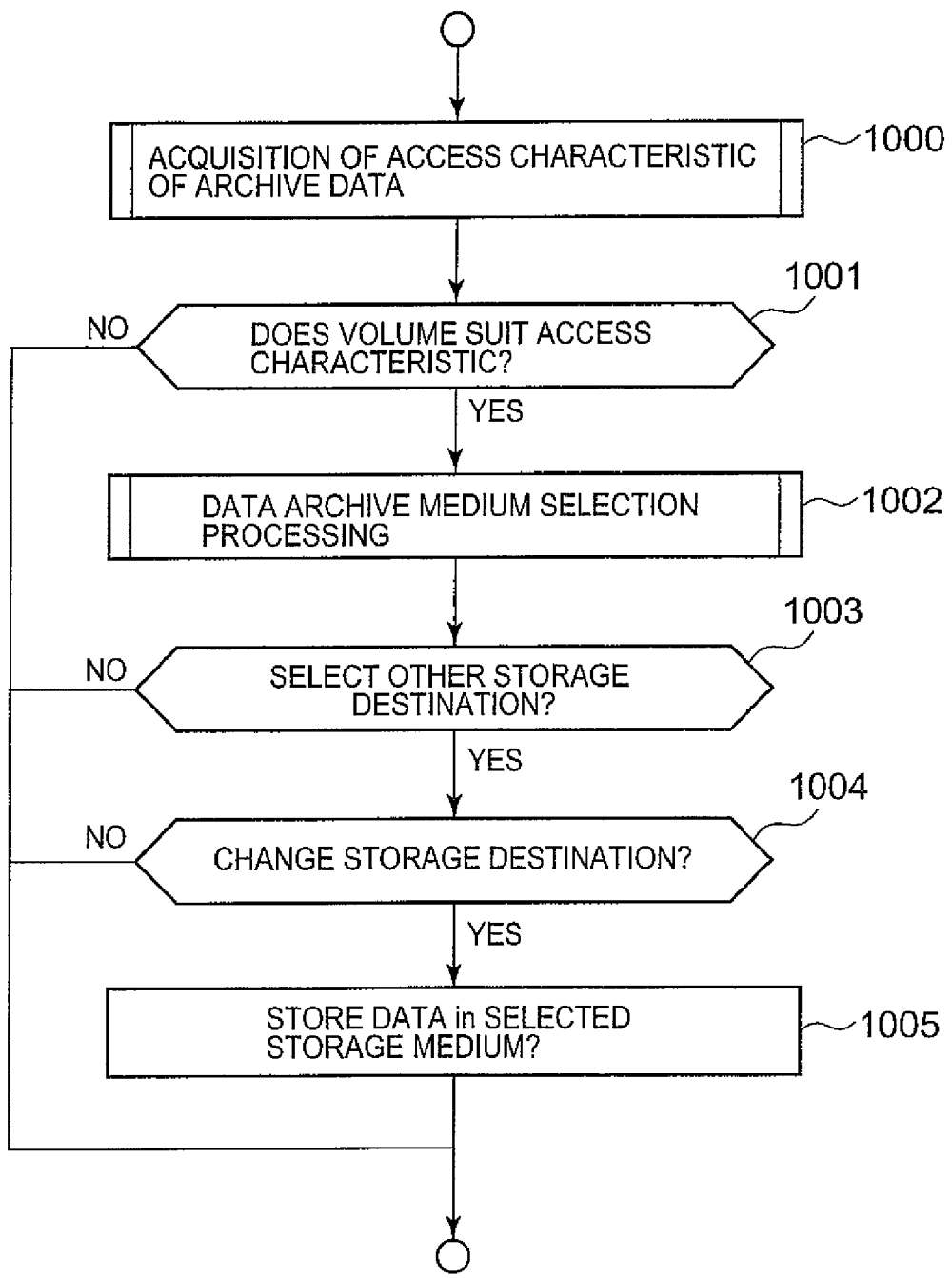
FIG. 10 is an example of a flowchart that shows archive location update processing of the second embodiment of the present invention.

FIG. 10 is an example of a flowchart that shows archive location update processing according to the second embodiment of the present invention. The archive location update processing is executed by the data migration program 107.

In step 1000, the data migration program 107 obtains the access characteristic of archive target data, that is, obtains an indication of whether the pattern of access to the archive target data is sequential or random and of whether the data has a Read focus (a lot of reading) or a write focus (a lot of writing). The data migration program 107 monitors the archive target data access characteristic such as whether the archive target data is obtained at regular or irregular intervals. The data migration program 107 then moves on to step 1001.

In step 1001, the data migration program 107 judges whether the currently allocated volume is suited to the access characteristic. If the volume is suited to the access characteristic, the data migration program 107 moves to step 1002 and if the volume is not suitable, the data migration program 107 ends the processing.

For example, the volume in which the archive target data of data ID "D3" is stored is L3 in the data archive management table of FIG. 7. It can be seen from the volume table 220, parity group table 210, and storage media table 200 (See FIG. 3) that volume "L3" is a flash memory volume. It is clear from the data characteristic table in FIG. 7 that the flash memory is a Read-focus storage medium.

Here, when the archive target data "D3" is updated to a Write focus, the data migration program 107 knows that the flash memory no longer conforms to this characteristic. Hence, in this case, the data migration program 107 moves to step 1002 because the volume is not suited to the access characteristic. If the archive target data "D3" retains a Read focus, because there is no particular change in the access characteristic, the data migration program 107 judges that the flash memory volume is also suited to the characteristic and ends the processing.

In step 1002, the data migration program 107 performs archive medium selection processing. This is the processing described earlier, i.e. the processing up until immediately before the judgment is Yes in step 608 of FIG. 6 and the processing moves to step 611. The processing then moves to step 1003.

In step 1003, the data migration program 107 judges whether the current storage destination volume and the storage destination volume selected in step 1002 are the same storage destination volume. If these volumes are indeed the same, the data migration program 107 ends the processing and, if the volumes differ, the data migration program 107 moves to step 1004.

Because the storage destination is different in step 1004, the data migration program 107 asks the user whether data are to be transferred to the newly selected volume. When a response to the effect that no data transfer is to be performed is received from the user, the data migration program 107 ends the processing without doing anything in particular. When a response to the effect that data are to be transferred is received from the user, the data migration program 107 moves to step 1005. The data migration program 107 may also make a determination in step 1004 without asking the user.

In step 1005, the data migration program 107 stores archive target data in the newly selected storage destination volume. Following this processing, the data migration program 107 ends the overall processing operation of FIG. 10.

In addition to when the access characteristic is updated and a storage medium is added and so forth, the flow above can also be applied when there is a change in a value of the cost table 410. If there is a change to the cost table when a storage medium is added, this may lead to the data migration program 107 starting the processing after step 1002. Further, an indication of whether there is a cost focus may also be stored in addition to the archive target data. In this case, the step 1002 advances the processing of the flowchart of FIG. 9 and, when the judgment is finally Yes in step 608 of FIG. 6, the processing up until immediately before the move to step 611 can be performed.

Further, in the above flow, when the archive target data stored in the current storage destination volume is transferred to the newly selected storage destination volume, the data migration program 107 may delete the archive target data from the current storage destination volume. However, when the current storage destination volume is a flash memory volume, the processing to delete the data is processing to bury data of a predetermined code. Hence, the archive target data of the transfer source may need not be deleted also so that there is no shortening of the lifespan of the flash memory. Here, the transfer source archive target data are unnecessary and, therefore, the data size of the archive target data may be the free capacity and the other archive target data may be overwritten. The archive target data can actually be dispensed with by such overwriting.

Third Embodiment

Figure 11:
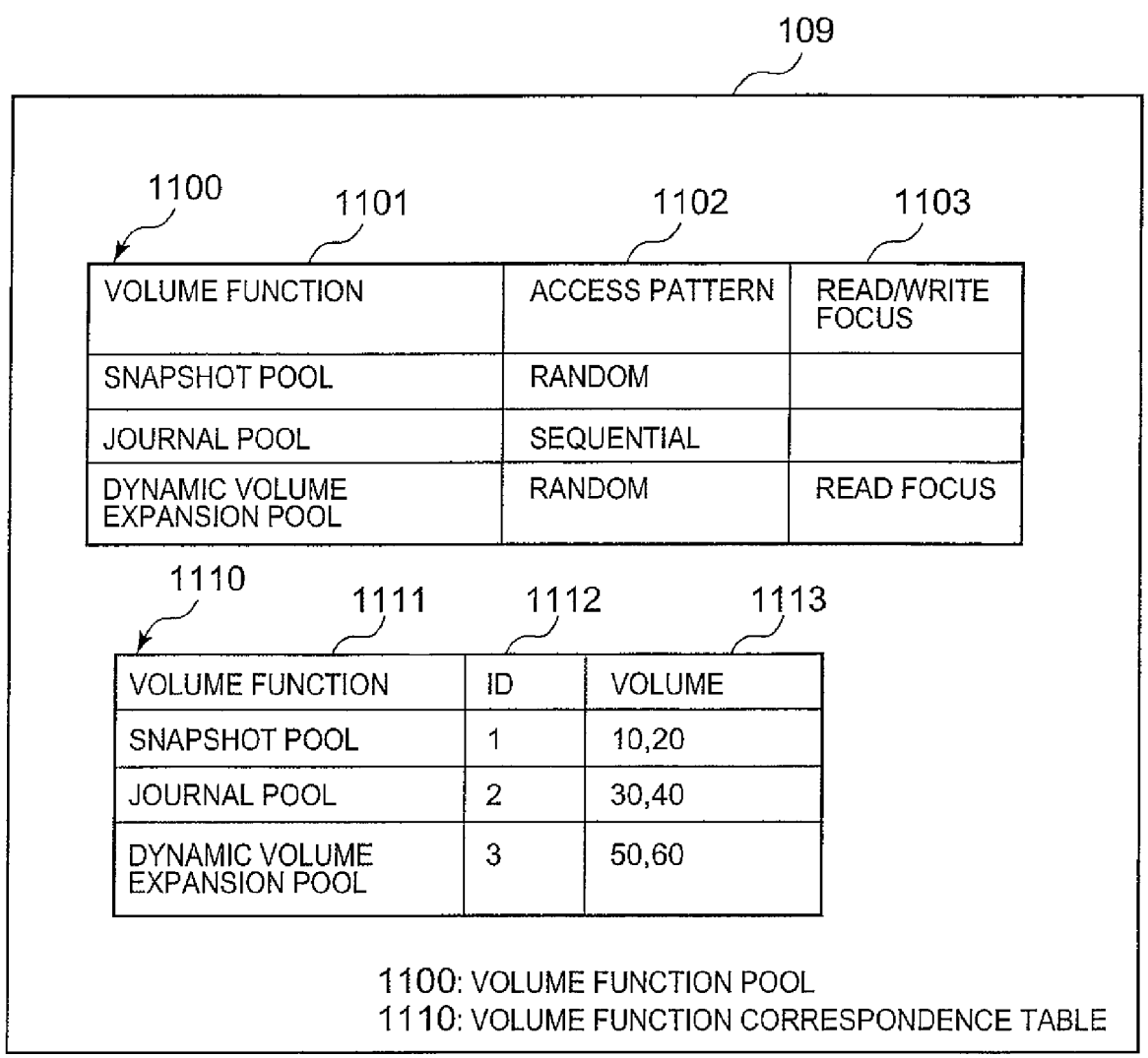
FIG. 11 shows a constitutional example of data management information 109 of a third embodiment of the present invention.

FIG. 11 shows a constitutional example of the data management information 109 of the third embodiment of the present invention.

In the third embodiment, in addition to the elements described in the second embodiment, a volume function table 1100 and a volume function correspondence table 1110 are also included in the data management information 109.

The volume function table 1100 has a column 1101 in which the volume function (in other words, the application) is written, a column 1102 in which the access pattern of the volume function is written, and a column 1103 in which the Read/Write focus of the volume function is written.

Here, volume functions include, for example, a snapshot pool that indicates a volume group for storing a snapshot differential, a journal pool constituting a volume group for managing information corresponding with the volume update history and the data update order and so forth, and a dynamic volume expansion pool constituting a volume group that is used by a function to expand the capacity of a volume dynamically in accordance with writing. Further, the example in FIG. 11 shows that the access pattern of the snapshot pool is random, the access pattern of the journal pool is sequential, and the dynamic volume expansion pool has a random access pattern and a Read focus.

Storage media may be directly allocated in the volume function table rather than the access pattern and Read focus items and so forth. That is, instead of the respective columns of volume function, access pattern and Read/Write focus being prepared for the volume function table 1100, a column in which attributes relating to the storage medium are recorded may be prepared. Further, the storage medium class, namely, "HDD" and "flash memory", for example, may be stored as the attributes recorded in the column. Further, when the volume function is snapshot pool or journal pool, for example, "HDD" is recorded as the storage medium class and, as a result, when snapshot pool or journal pool is set, the respective volumes constituting the respective pools may be hard disk volumes. In addition, when the volume function is a dynamic volume expansion pool, "flash memory" is recorded as the storage medium class and, as a result, when the dynamic volume expansion pool is set, the respective volumes constituting the pool may be flash memory volumes.

The volume function correspondence table 1110 is a table for managing volumes allocated to the respective volume functions and identifiers of the pools constituted by each function. The volume function correspondence table 1110 has a column 1111 in which the volume function is written, a column 1112 in which the ID constituting the identifier of the respective function pools is written, and a column 1113 in which the IDs of the respective volumes allocated to the pool of the respective functions is recorded. For example, according to the example in FIG. 11, the volume function correspondence table 1110 shows that the ID of the snapshot pool is "1" and the volumes allocated to the snapshot pool have the IDs "10" and "20".

Figure 12:
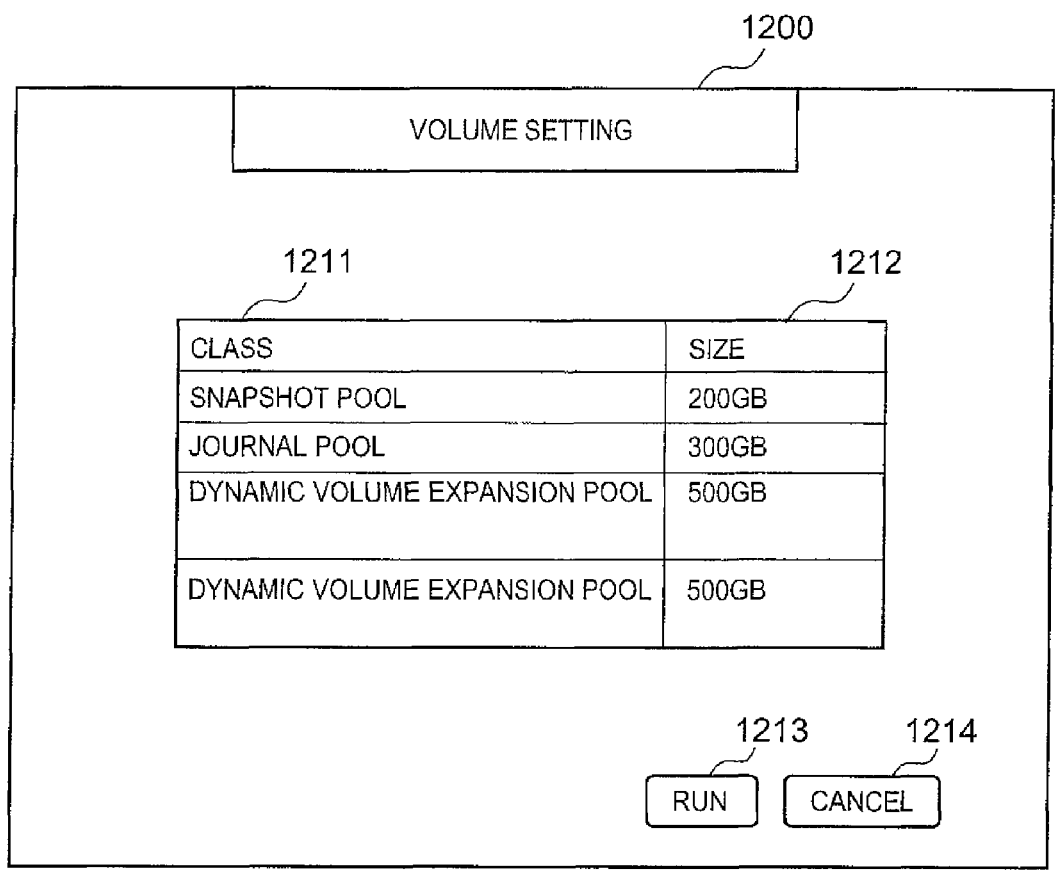
FIG. 12 shows an example of a volume function designation screen displayed by the third embodiment of the present invention.

FIG. 12 shows an example of the volume function designation screen displayed by the third embodiment of the present invention.

For example, the volume function setting program 106 is able to display a volume function designation screen 1200 in response to a predetermined request from the user. The volume function designation screen 1200 has an entry field 1211 for the type of volume function, an entry field 1212 for the size (pool capacity) required by the volume setting, a run button 1213 which is a button for issuing an instruction to set the volume function, and a button 1214 for canceling the execution.

The number of the existing volumes being used may be designated instead of a size designation in the size entry field 1212. In this case, the volume function setting program 106 checks whether the characteristic of the volume corresponding with the designated number satisfies the designated volume function and, when it is judged that the function is satisfied, the volume function setting program 106 is able to include the designated volume in the pool of the designated volume function.

Furthermore, when no particular volume function is added when the volume is set, the item indicating the data ID are set as the volume ID in FIGS. 5 and 9 and so forth and a volume that corresponds with the characteristic may be created. Such creation also allows a volume suited to the characteristic to be set.

Furthermore, data migration of information on the respective volume functions to another storage or the like is sometimes performed. In this case, by designating information on the migration origin instead of the size, the size of the migration source is handed over and the volume of the migration destination may be set by the subsequent flowchart of FIG. 13. Data migration may then be performed from the volume of the migration source to the volume of the migration destination.

Figure 13:
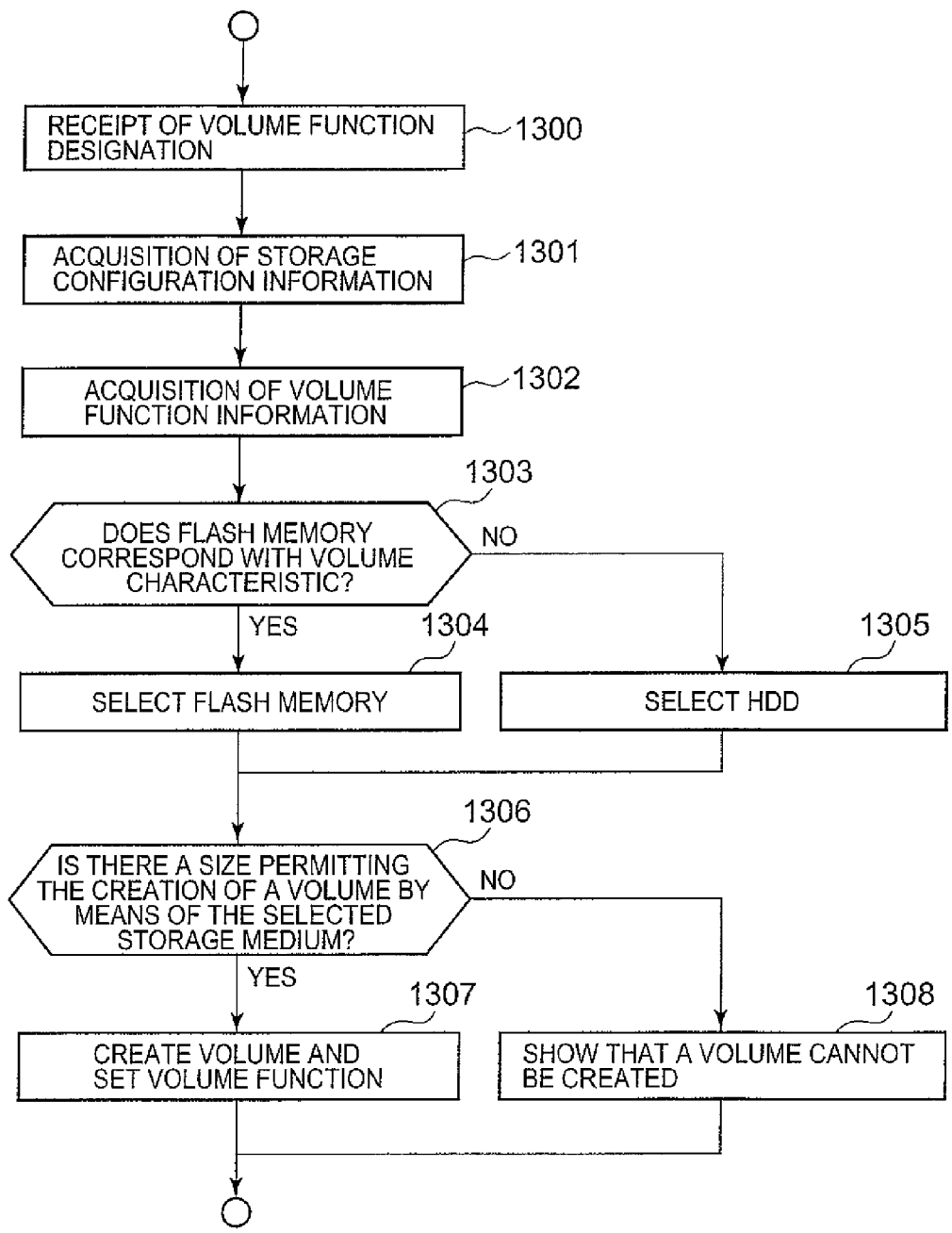
FIG. 13 is an example of a flowchart of the volume function setting processing of the third embodiment of the present invention.

FIG. 13 is an example of the flowchart of the volume function setting processing of the third embodiment of the present invention. This processing is performed by the volume function setting program 106.

In step 1300, the volume function setting program 106 receives volume function settings via the screen 1200 of FIG. 11, for example, and then moves to step 1301.

In step 1301, the volume function setting program 106 obtains the storage configuration information 117 and 127 and moves to step 1302.

In step 1302, the volume function setting program 106 obtains the information recorded in the data characteristic table 710 and information recorded in the volume function table 1100 from the data management information 109. Thereafter, the volume function setting program 106 moves to step 1303.

In step 1303, the volume function setting program 106 judges whether the flash memory corresponds to the volume characteristic. If the flash memory corresponds with the characteristic, the volume function setting program 106 moves to step 1304 and, if the HDD corresponds with the characteristic, the volume function setting program 106 moves to step 1305.

For example, the volume function setting program 106 knows from the obtained information that the dynamic volume expansion volume has a random access pattern and a Read focus (See FIG. 11) and is able to specify flash memory as the recommended storage medium that corresponds with the random access and Read focus. Hence, in this case, the volume function setting program 106 moves to step 1304. Further, although the journal pool has a sequential characteristic, there is no Read focus and the storage medium in particular cannot be selected from the data characteristic table. Thus, in this case, the storage medium in particular cannot be selected and the volume function setting program 106 moves on to step 1305. If settings such as journal pool and Read focus are made in the volume function table, the access pattern is then sequential and there is a Read focus. Hence, the flash memory can be specified from FIG. 11 as the recommended storage medium. Hence, in this case, the volume function setting program 106 moves to step 1304.

In step 1304, the volume function setting program 106 selects the storage medium for setting the volume as the flash memory in accordance with the results of step 1303 and then moves to step 1306.

In step 1305, the volume function setting program 106 selects a storage medium that is not flash memory as the storage medium, that is, a hard disk. Thereupon, if the archive period of the volume setting itself is fixed, the archiving costs may be considered and it may be judged which storage medium is to be the target of cost reductions. This judgment is the same as that of the flowchart of FIG. 6. The volume function setting program 106 then moves to step 1306.

In step 1306, the volume function setting program 106 judges whether it is possible to create a volume that satisfies the designation of step 1301 by means of the selected storage medium, that is, whether the size of the designated volume can be secured. The volume function setting program 106 moves to step 1307 if a size permitting creation of the volume can be secured and moves to step 1308 if not. The judgment of step 1306 can be made, for example, by judging whether the free capacity of the total of the storage medium group comprising the selected storage medium is equal to or more than the size of the designated volume.

In step 1307, the volume function setting program 106 creates a volume on the basis of information obtained in step 1301 and makes settings so that the volume functions can be executed. The volume function setting program 106 then ends the processing.

In step 1308, the fact that a size permitting creation of the volume does not exist is reported to the user. The processing is then ended.

Also when a volume is set, this processing allows a storage medium with a volume function to be selected in accordance with the characteristic of the storage medium and allows a volume to be set. Further, in a case where volume migration is set by the designation of FIG. 12, when the volume of the migration source is designated instead of the size, for example, the volume set in step 1307 can be set as the migration destination and data migration can be performed from the migration source.

Fourth Embodiment

Figure 14:
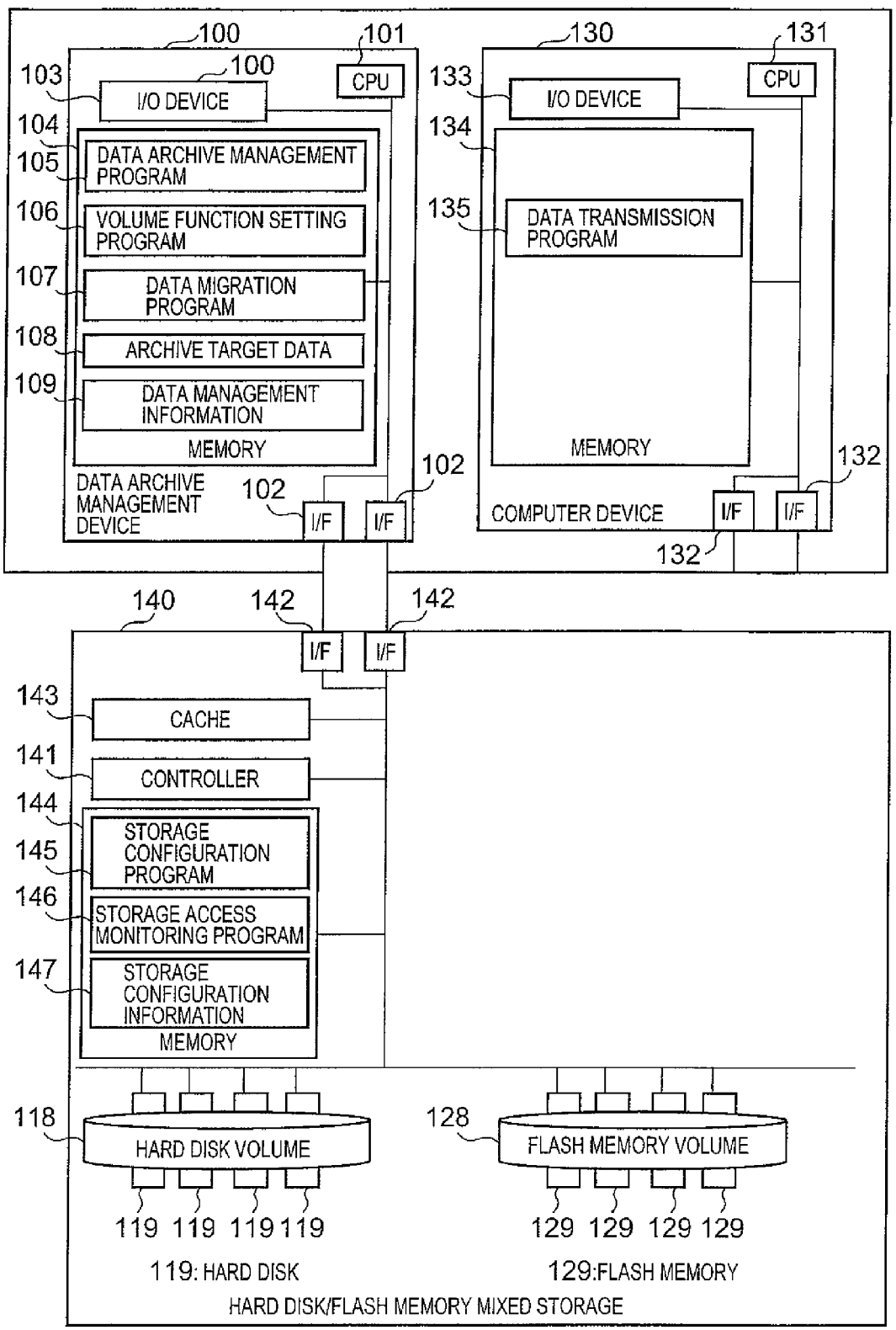
FIG. 14 shows a constitutional example of a computer system according to a fourth embodiment of the present invention.

FIG. 14 shows a constitutional example of the computer system of the fourth embodiment of the present invention.

The fourth embodiment comprises a hard disk/flash memory mixed storage 140 instead of the hard disk storage 110 and flash memory storage 120. That is, a plurality of hard disks 119 and a plurality of flash memory 129 are provided in one storage 140. As a result, both the hard disk volume 118 and flash memory volume 128 are provided in one storage 140. Further, the reference numerals 141 to 147 each have the same functions as the reference numerals 111 to 117. Further, the functions of the data archive management device 100 may be applied to the hard disk/flash memory mixed storage.

Fifth Embodiment

Figure 15:
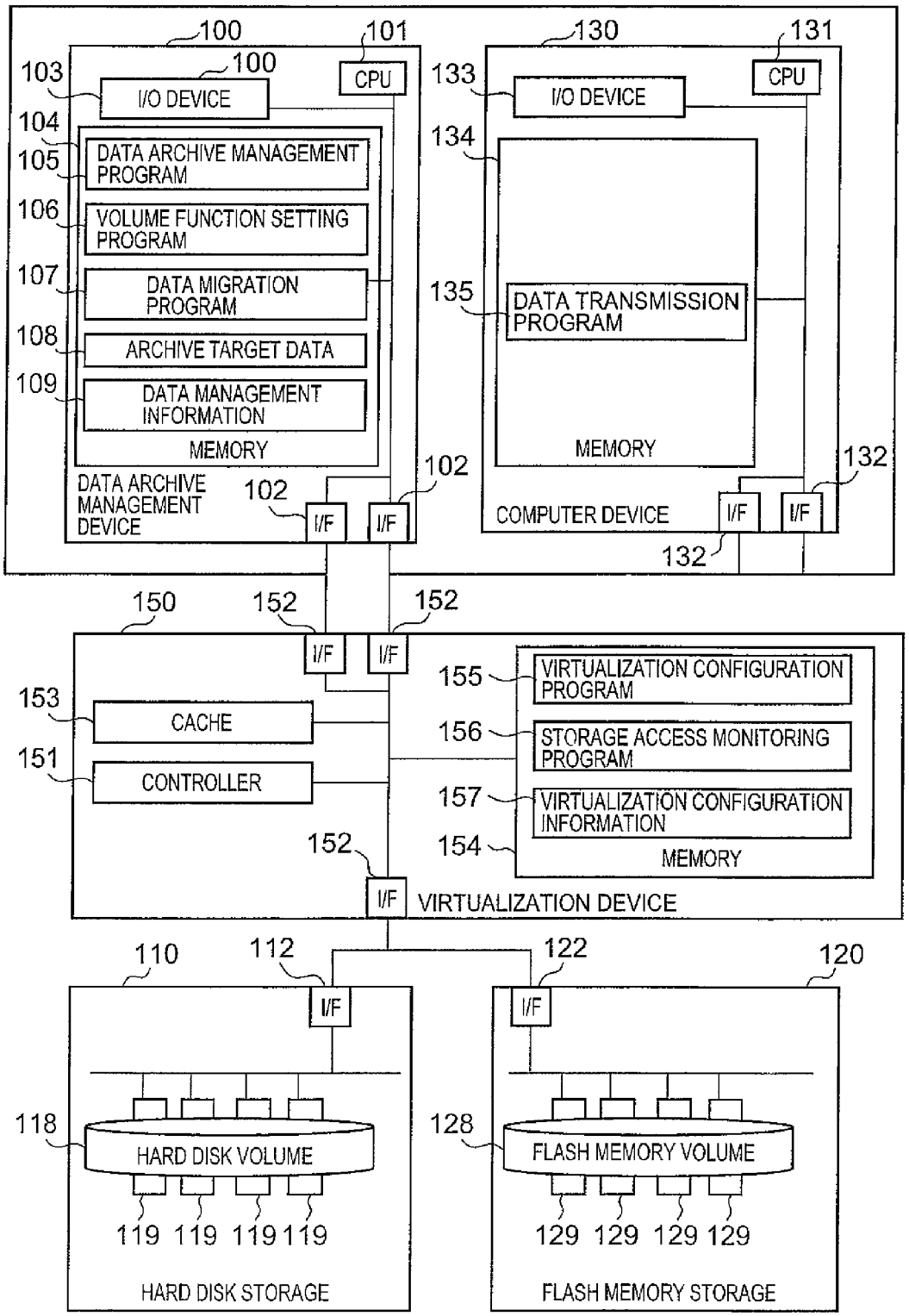
FIG. 15 shows a constitutional example of a computer system according to a fifth embodiment of the present invention.

FIG. 15 shows a constitutional example of a computer system according to a fifth embodiment of the present invention.

In the fifth embodiment, a virtualization device 150 is installed between the data archive management device 100 and the hard disk storage 110 and flash memory storage 120. The data archive management device 100 accesses the hard disk storage 110 and flash memory storage 120 via the virtualization device 150. The data archive management device 100 may also connect to the hard disk/flash memory mixed storage 140 shown in the fourth embodiment in addition to accessing the hard disk storage 110 and flash memory storage 120.

The virtualization device 150 is a device that provides a host (the data archive management device 100, for example) with the storage resources of the hard disk storage 110 and flash memory storage 120 as if these resources were the host's own storage resources. From the perspective of the virtualization device 150, the storage 110 and 120 are so-called external storage. The virtualization device 150 comprises a controller 151, an I/F 152, a cache 153, and a memory 154.

A virtualization configuration program 155, a storage access monitoring program 156, and storage configuration information 157 are stored in the memory 154. The virtualization configuration program 155 and storage access monitoring program 156 are executed by the controller 151. The storage configuration information 157 is information used by the virtualization configuration program 155 and storage access monitoring program 156.

The virtualization configuration program 155 provides a computer such as the data archive management device 100 with the volumes of the hard disk storage 110, flash memory storage 120, and hard disk/flash memory mixed storage 140 illustrated by the fourth embodiment as virtualized volumes. The virtualization configuration program 155 has a function for obtaining a volume of the virtualization device by virtualizing the hard disk volume 118 and flash memory volume 128 and permitting identification of same by a computer such as the data archive management device 100 via the I/F 152, and a storage function for performing data migration between the hard disk volume 118 and flash memory volume 128 and so forth.

The storage access monitoring program 156 is able to monitor what kind of access is made to which volume of the hard disk storage 110, flash memory storage 120, and the hard disk/flash memory mixed storage 140 illustrated by the fourth embodiment.

The computer system above is also able to manage the hard disk volume 118 and flash memory volume 128 and so forth by applying the tables and programs of at least one embodiment among the first to third embodiments. Further, the functions of the data archive management device 100 may be applied to the virtualization device 150.

Sixth Embodiment

Figure 16:
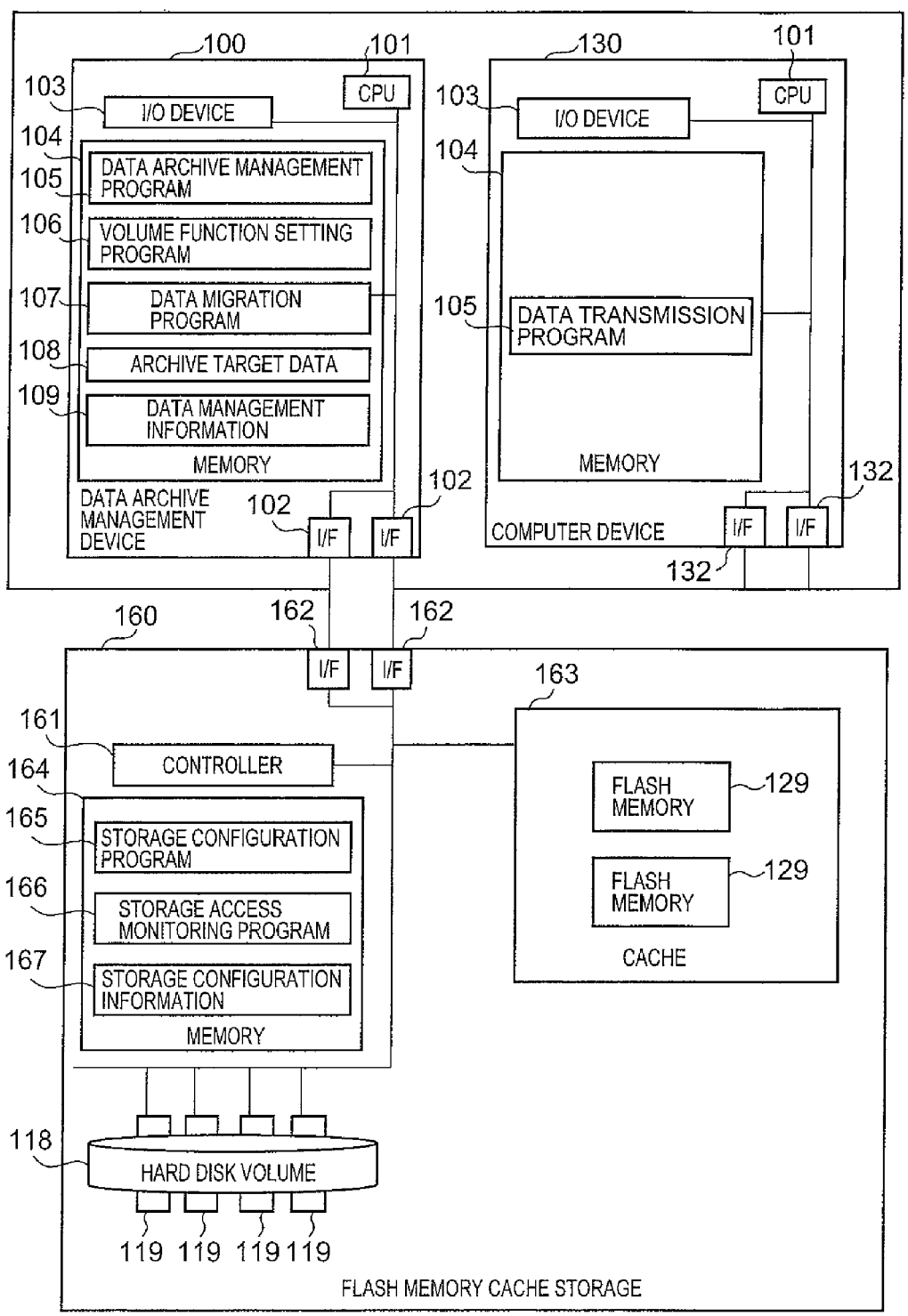
FIG. 16 shows a constitutional example of a computer system according to a sixth embodiment of the present invention.

FIG. 16 shows a constitutional example of the computer system according to the sixth embodiment of the present invention.

In the sixth embodiment, the flash memory 129 is defined in the cache 133. Because the flash memory 129 has the same semiconductor memory as the cache, a case where a cache exists may also be considered. In such a configuration, the flash memory volume 128 can be defined in the cache. Further, the reference numerals 161 to 167 have the same functions as those of the reference numerals 111 to 117 respectively. The functions of the data archive management device 100 may also be applied to a flash memory cache storage 160.

Seventh Embodiment

Figure 17:
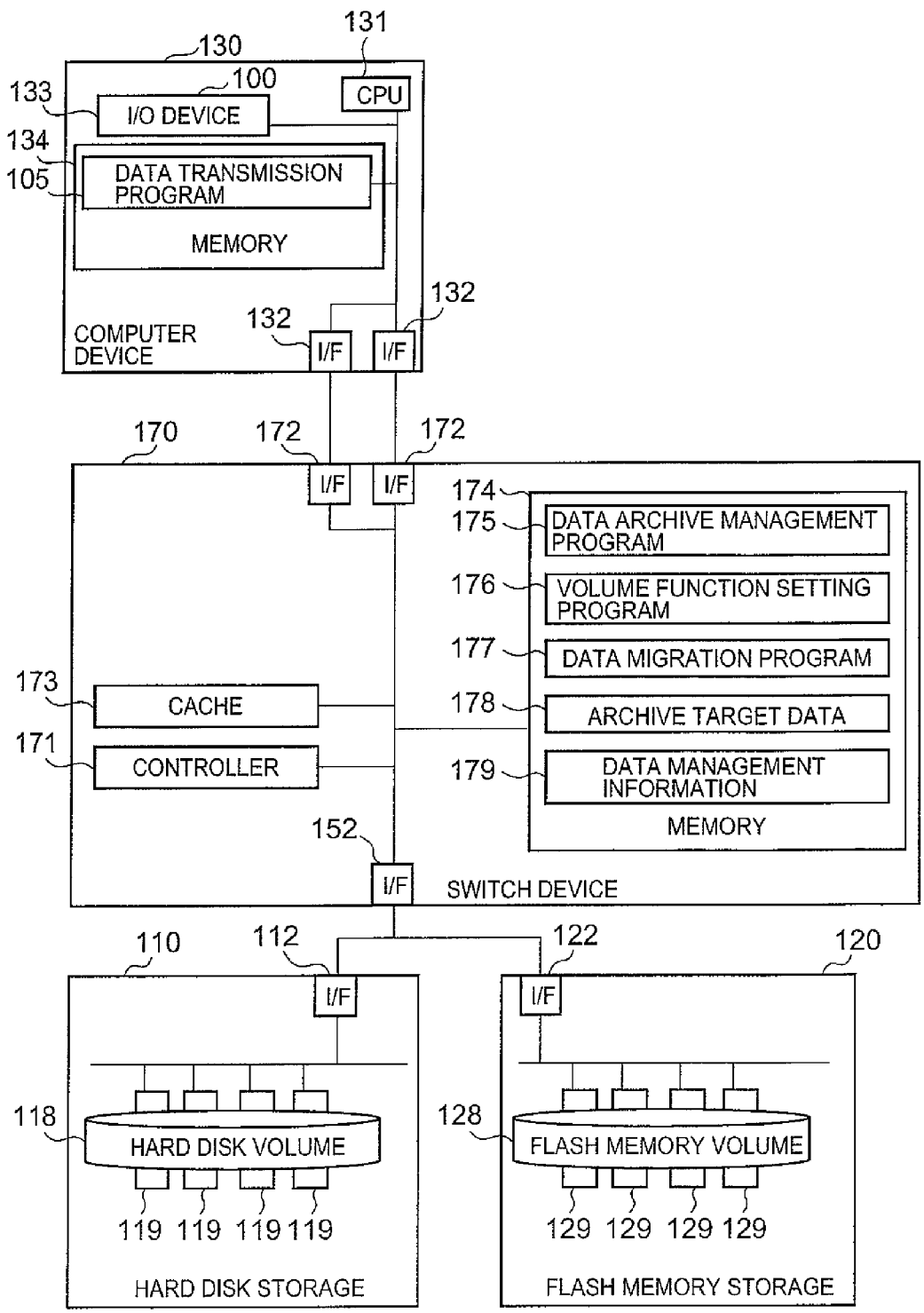
FIG. 17 shows a constitutional example of a computer system according to a seventh embodiment of the present invention.

FIG. 17 shows a constitutional example of the computer system according to the seventh embodiment of the present invention.

In the seventh embodiment, the functions of the data archive management device 100 are applied to a switch device instead of the virtualization device 150 of the fifth embodiment.

A switch device 170 is a switch device of a fiber channel network, for example. The switch device 170 has a controller 171, an I/F 172, a cache 173, and a memory 174. The memory 174 stores a data archive management program 175, a volume function setting program 176, a data migration program 177, archive target data 178, and data management information 179. That is, the functions of the data archive management device 100 are applied to the switch device 170.

The embodiment of the present invention and a few embodiment examples were described hereinabove but this embodiment and these embodiment examples only serve to illustrate the inventions of the present invention, there being no intention to limit the scope of the present invention to this embodiment and these embodiment examples. The present invention can also be implemented in a variety of other forms without departing from the spirit thereof.

For example, when the storage medium is selected, if the access pattern is random, the flash memory may be selected and, when the access pattern is sequential, the hard disk may be selected. This is because, when the access pattern is random, the head of the hard disk performs a lot of seeking. However, in this case, when "read focus" is set in addition to the access pattern "random", the flash memory may be selected. On the other hand, when "write focus" is set in addition to the access pattern "sequential", the lifespan of the flash memory when writing is produced is shorter and, therefore, the hard disk may be selected. That is, when both the access pattern and the Read/Write focus are set, the recommended storage medium is set with the priority on the Read/Write focus and, in the absence of a Read/Write focus, the storage medium may be selected depending on whether the access pattern is random or sequential.

In a first embodiment of the control device according to the present invention, the storage device of the first type is a storage device of a type having restrictions on the write number. A fourth acquisition module for acquiring a write number threshold value of the storage device of the first type; a calculation module for calculating the write number produced when the archive target data is written to the storage device of the first type on the basis of the data size of the archive target data; and a fifth acquisition module for acquiring the current total write number of each of a plurality of the storage devices of the first type are further provided. When the storage device of the first type is selected, the selection module selects storage devices of the first type for which the sum of the calculated write number and the total write number is equal to or less than the write number threshold value.

In the second embodiment, the storage system according to the first embodiment has a plurality of parity groups. Each of the plurality of parity groups is constituted by two or more of the storage devices of the first type. The archive target data are stored distributed to storage devices of the first type that constitute the parity groups. The selection module selects, when storage devices of the first type are selected, a parity group for which each of the two or more storage devices of the first type that constitute the parity group are at or below the write number threshold value from among the plurality of parity groups.

In the third embodiment, the second embodiment is further provided with a sixth acquisition module for acquiring the RAID level of each of the plurality of parity groups. The calculation module calculates the write numbers of the respective storage devices of the first type that constitute the respective parity groups on the basis of the respective RAID levels thus acquired.

In the fourth embodiment, the storage device of the first type is a flash memory (may also be another type of storage device having write number restrictions such as a DVD). The storage device of the second type is a hard disk.

In the fifth embodiment, a seventh acquisition module for acquiring a data access characteristic that constitutes the access characteristic of the archive target data is further provided. The selection module selects a storage device of a type having a device access characteristic that is suited to the acquired data access characteristic and for which the total cost is minimum from among the storage devices of the plurality of types. The device access characteristic is the access characteristic of the storage device.

In the sixth embodiment, according to the fifth embodiment, the data access characteristic and the device access characteristic are at least one of an access pattern and a read priority or write priority.

In the seventh embodiment, according to the sixth embodiment, the storage device of the first type is a storage device of a type having restrictions on the write number. The selection module selects a storage device of the first type when the data access characteristic and the device access characteristic are read priority and selects a storage device of the second type in the case of a write priority.

In an eighth embodiment, according to the sixth embodiment, the access pattern includes random access and sequential access. The selection module selects a storage device of the first type when the data access characteristic and the device access characteristic are random access, and selects a storage device of the second type in the case of sequential access.

In a ninth embodiment, according to the eighth embodiment, the storage device of the first type is a storage device of a type having restrictions on the write number. The selection module selects a storage device of the second type when the data access characteristic and the device access characteristic are random access and write priority.

In a tenth embodiment, according to the eighth embodiment, the storage device of the first type is a storage device of a type having restrictions on the write number. The selection module selects a storage device of the first type when the data access characteristic and the device access characteristic are sequential access and read priority.

In an eleventh embodiment, according to the fifth embodiment, a monitoring module for monitoring the access characteristic with respect to the archive target data; a first judgment module for judging whether the access characteristic obtained by the monitoring and the device access characteristic of the selected storage device differ; and a data migration module are further provided. When it is judged that the access characteristic obtained by the monitoring and the device access characteristic of the selected storage device differ, the selection module selects the storage device of a type having a device access characteristic suited to the access characteristic obtained by the monitoring from among the storage devices of the plurality of types. The data migration module performs data migration from the selected storage device to a storage device having a device access characteristic suited to the access characteristic.

In a twelfth embodiment, a second judgment module for judging whether there is a cost focus is further provided. When it is judged that there is no cost focus, the selection module selects a storage device of a type having a device access characteristic suited to the acquired data access characteristic from among the storage devices of the plurality of types. The device access characteristic is the access characteristic of the storage device.

In a thirteenth embodiment, a reception module for receiving a designation of a volume function and a logical volume to which the volume function is assigned from the user; an eighth acquisition module for acquiring an access characteristic corresponding with the designated volume function; a specification module for specifying a storage device that constitutes the designated logical volume from among the plurality of storage devices; a third judgment module for judging whether the access characteristic of the specified storage device is suited to the acquired access characteristic; and a volume function assignment control module that does not assign the volume function to the designated logical volume when it is judged that the access characteristic of the specified storage device is not suited to the acquired access characteristic are further provided.

In a fourteenth embodiment, the control device is a host device of the storage system which is connected to a virtualization device that provides a plurality of the storage devices of the first type and a plurality of the storage devices of the second type of the storage system as if the storage devices of the first and second types were the virtualization device's own storage resources.

In a fifteenth embodiment, the storage system comprises a cache memory for temporarily storing data that are written to the storage devices or read from the storage devices of the storage system by the host device of the storage system, and the cache memory comprises a plurality of the storage devices of the first type.

In a sixteenth embodiment, the control device is a switch device that is interposed between the host device of the storage system and the storage system.

A control device according to another aspect of the present invention comprises an acquisition module for acquiring a data access characteristic which is an access characteristic of archive target data constituting a target that is archived by the storage system; and a selection module for selecting a storage device of a type having a device access characteristic suited to the acquired data access characteristic from among the storage devices of the plurality of types. The device access characteristic is the access characteristic of the storage device. The access characteristic is at least one of sequential access or random access, and a read priority or write priority.

A control device according to yet another aspect of the present invention comprises a reception module for receiving a designation of a volume function and a logical volume provided with the volume function from a user; an acquisition module for acquiring an access characteristic that corresponds with the designated volume function; a specification module for specifying from among the plurality of storage devices a storage device that constitutes the designated logical volume; a judgment module for judging whether the access characteristic of the specified storage device is suited to the acquired access characteristic; and a control module that does not provide the designated logical volume with the volume function when it is judged that the access characteristic of the specified storage device does not suit the acquired access characteristic. The access characteristic is at least one of sequential access or random access, and a read priority or write priority. The volume function is at least one of a function for storing differential data produced by the snapshot management; a function for storing the update history of the first logical volume; and a function that is dynamically allocated to the second logical volume in accordance with writing with respect to the second logical volume.

These control devices may be a host device of the storage system (a host computer that issues I/O commands to the storage system or a management computer that manages the storage system, for example), for example, and may be provided in the storage system or provided in an intermediate device that is provided between the storage system and the host device. Alternatively, the respective parts of the control devices may be provided distributed to at least two of the host device of the storage system, the intermediate device, and the storage system.

The respective parts of each of the control devices can be implemented by hardware (a circuit, for example), computer programs run by a processor (a CPU, for example), or a combination of hardware and computer programs (a portion of a certain part is executed by the hardware while the remainder is executed by a computer program, for example). Each of the computer programs can be read from the storage resources (memory, for example) provided in a computer machine. The storage resources can also be installed via a recording medium such as a CD-ROM or DVD (Digital Versatile Disk) or the like or can be downloaded via a communication network such as the Internet or a LAN.

What is claimed is:

1. A control device of a storage system that comprises a plurality types of storage devices, comprising:
    a memory which stores a data management information regarding data which is stored in the storage devices;
    a CPU coupled to the memory;
    an input device, coupled to the CPU, which receives an input information, the input information including at least a size and an archive deadline of data which is stored in the storage devices;
    wherein the data management information includes a write threshold value regarding one type of storage devices, the write threshold value indicating a write limit number to the one type of storage devices,
    wherein the CPU selects a storage device which stores data corresponding to the information which is input to the input device, on a basis of an archiving cost which is calculated by an arising bit cost of a new volume of the storage devices and the costs of performing data migration from existing volume to the new volume of the storage devices, the input information, and the data management information which is stored in the memory, a cost target item and a bit cost of the cost target item,
    wherein the CPU stores to the selected storage device, the data corresponding to the information which is input to the input device, and
    wherein the CPU registers to the data management information in the memory, at least one of the information which is input to the input device.

2. The control device according to claim 1,
    wherein the information which is input to the input device further includes at least one of an access pattern and read priority or write priority of data which is stored in the storage devices.

3. The control device according to claim 1,
    wherein the one type of storage devices is a flash memory.

4. A control device of a storage system that comprises a plurality types of storage devices, comprising:
    a memory which stores a management information regarding the storage devices;
    a CPU coupled to the memory;
    an input device, coupled to the CPU, which receives an input information, the input information including at least a size which is required by volume setting to the storage devices and a volume function which is set to the storage devices;
    wherein the management information includes an information regarding a relation between a volume function and a type of storage devices, an access pattern of the type of storage device, and a read/write focus of the type of storage device,
    wherein the CPU selects a storage device which the volume function which is input to the input device is set, on a basis of an archiving cost which is calculated by an arising bit cost of a new volume of the storage devices and the costs of performing data migration from existing volume to the new volume of the storage devices, the input information and the management information which is stored in the memory,
    wherein the CPU set to the selected storage device, the volume function which is input to the input device,
    wherein the CPU registers to the management information in the memory, at least one of the information which is input to the input device.

5. The control device according to claim 4,
    wherein one of types of storage devices is a flash memory.

* * * * *